US012082591B2

United States Patent
Dunnewind et al.

(10) Patent No.: US 12,082,591 B2
(45) Date of Patent: Sep. 10, 2024

(54) MOULDING FOOD PRODUCTS FROM A PUMPABLE FOODSTUFF MASS

(71) Applicant: MAREL FURTHER PROCESSING B.V., Boxmeer (NL)

(72) Inventors: Albertus Dunnewind, Wageningen (NL); Johannes Martinus Meulendijks, Deurne (NL); Thomas Willem Dekker, Nijmegen (NL); Tihomir Tubic, Boxmeer (NL)

(73) Assignee: MAREL FURTHER PROCESSING B. V., Boxmeer (NL)

( * ) Notice: Subject to any disclaimer, the term of this patent is extended or adjusted under 35 U.S.C. 154(b) by 0 days.

(21) Appl. No.: 17/872,536

(22) Filed: Jul. 25, 2022

(65) Prior Publication Data

US 2022/0354136 A1 Nov. 10, 2022

Related U.S. Application Data

(62) Division of application No. 16/472,087, filed as application No. PCT/NL2017/050861 on Dec. 21, 2017, now Pat. No. 11,412,745.

(30) Foreign Application Priority Data

Dec. 21, 2016 (NL) ...................................... 2018037
Dec. 21, 2016 (NL) ...................................... 2018038

(51) Int. Cl.
*A22C 7/00* (2006.01)
(52) U.S. Cl.
CPC .......... *A22C 7/0069* (2013.01); *A22C 7/0076* (2013.01)
(58) Field of Classification Search
CPC ............................ A22C 7/0069; A22C 7/0076
See application file for complete search history.

(56) References Cited

U.S. PATENT DOCUMENTS

| 4,356,595 A | 11/1982 | Sandberg et al. |
| 5,618,571 A | 4/1997 | London et al. |

(Continued)

FOREIGN PATENT DOCUMENTS

| WO | WO 00/30458 A1 | 6/2000 |
| WO | WO 2004/002229 A2 | 1/2004 |
| WO | WO 2015/012690 A2 | 1/2015 |

OTHER PUBLICATIONS

International Search Report for PCT/NL2017/050861 (PCT/ISA/210) mailed on Jun. 11, 2018.

(Continued)

*Primary Examiner* — S. Behrooz Ghorishi
*Assistant Examiner* — Alexander A Wang
(74) *Attorney, Agent, or Firm* — Birch, Stewart, Kolasch & Birch, LLP

(57) ABSTRACT

An installation for moulding of three dimensional products from a mass of pumpable foodstuff material, for example from ground meat. The installation comprises a feed pump and a moulding device with a mobile mould member having multiple mould cavities. A mass feed member is arranged at a fill position relative to the path of the mobile mould member, which mass feed member is connected to an outlet of the feed pump. The member has a housing defining an elongated chamber with a longitudinal axis and having a pair of spaced apart long lateral walls, short end walls, and a bottom wall facing the mould member at the fill position along the path of the mould member. The bottom wall is provided with a discharge mouth formed by one or more discharge openings spanning the path of said mould cavities, so that foodstuff mass flows into each row of mould cavities via said discharge mouth. The mass feed member is provided with a single elongated plunger that is slidably received in the chamber, sliding between the lateral walls and the end walls. At least one lateral wall is provided with an intro- (Continued)

duction mouth formed by one or more introduction openings spanning a major portion of the length of said lateral wall.

18 Claims, 11 Drawing Sheets

(56)  References Cited

U.S. PATENT DOCUMENTS

| | | |
|---|---|---|
| 5,795,610 A | 8/1998 | London |
| 6,120,258 A | 9/2000 | Chen |
| 2005/0230875 A1 | 10/2005 | Miller et al. |
| 2008/0233228 A1 | 9/2008 | Lindee et al. |
| 2015/0208674 A1 | 7/2015 | Van Zoelen et al. |
| 2016/0374357 A1 | 12/2016 | Lok et al. |

OTHER PUBLICATIONS

Written Opinion of the International Searching Authority for PCT/NL2017/050861 (PCT/ISA/237) mailed on Jun. 11, 2018.

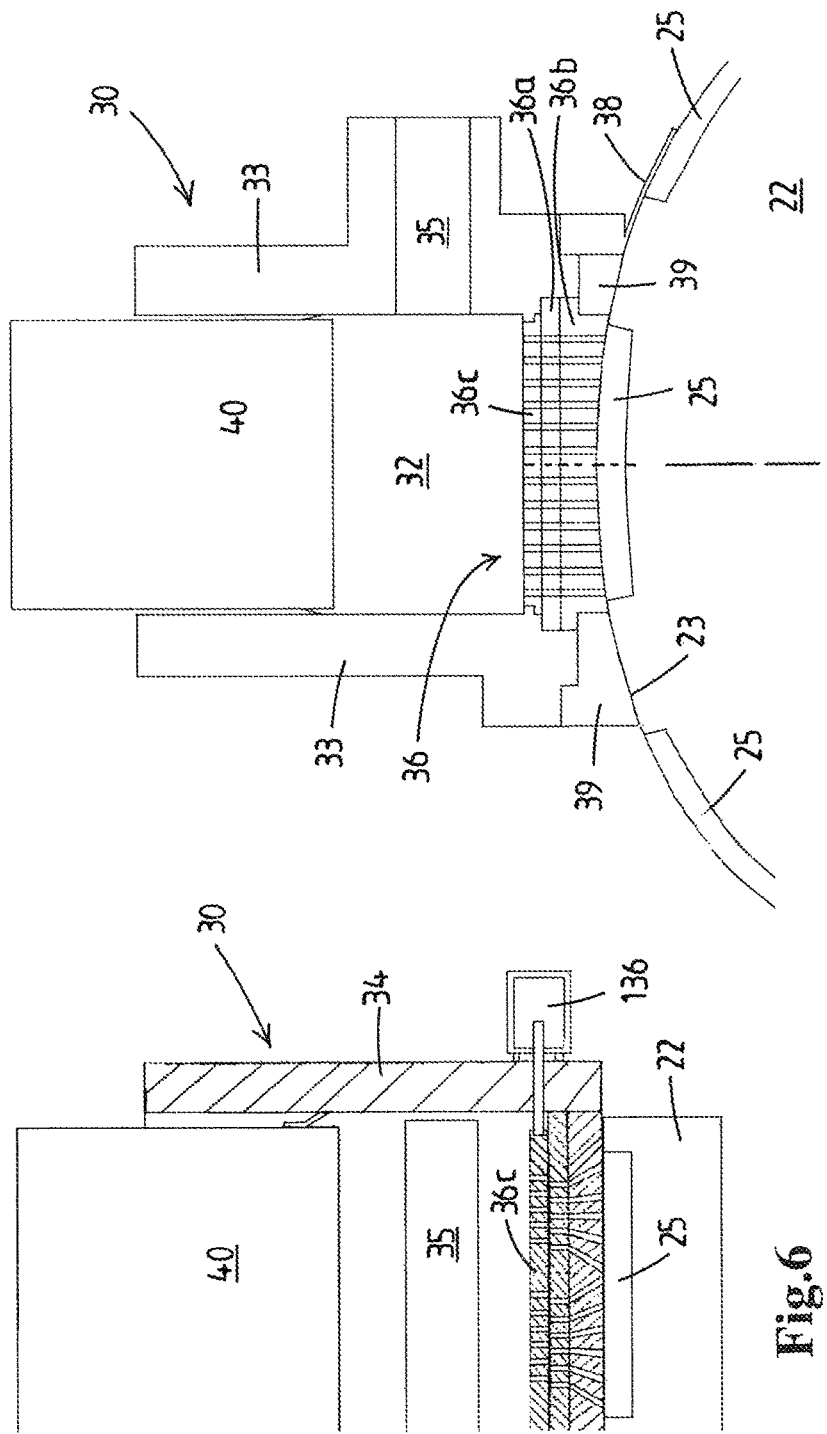

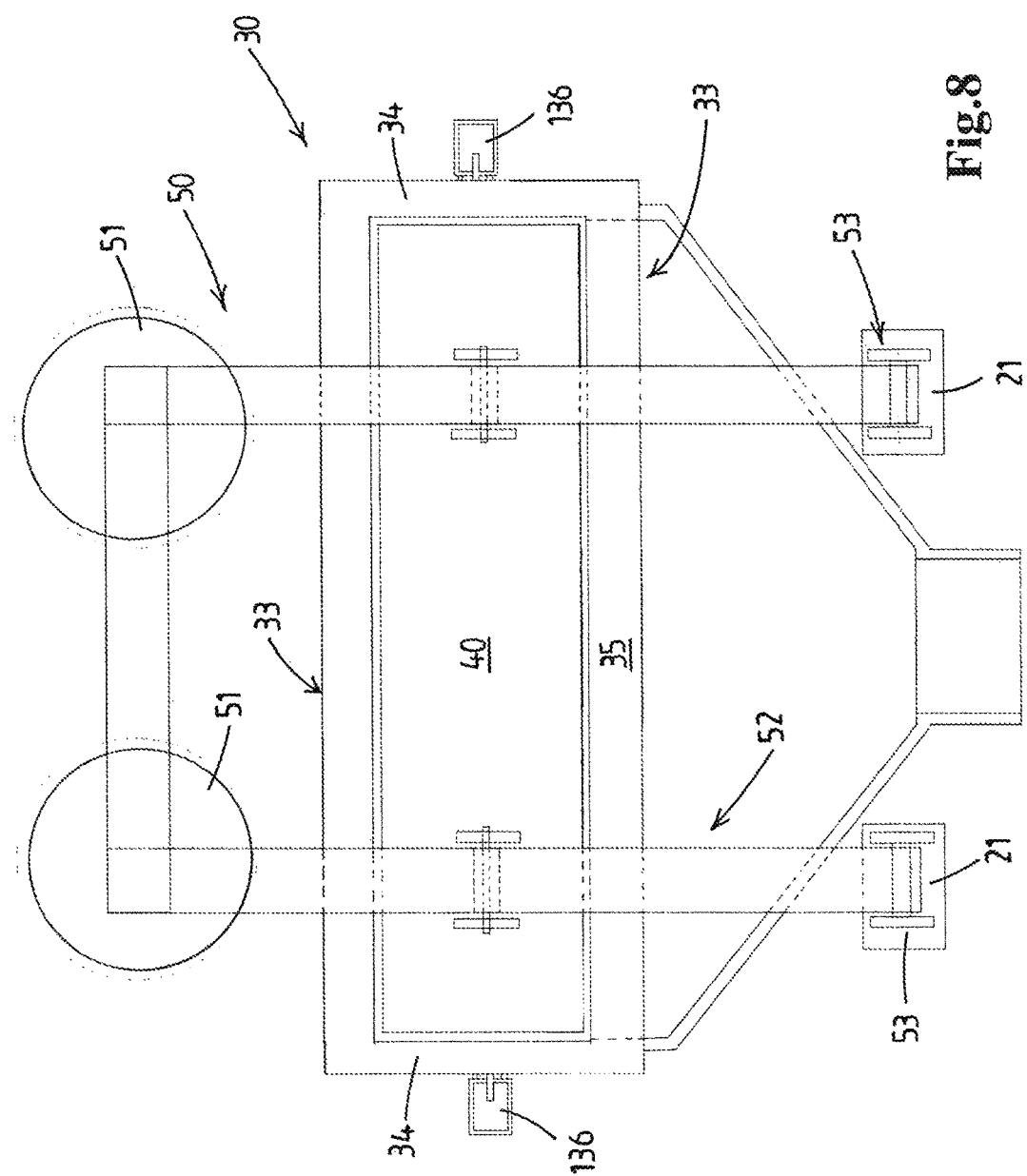

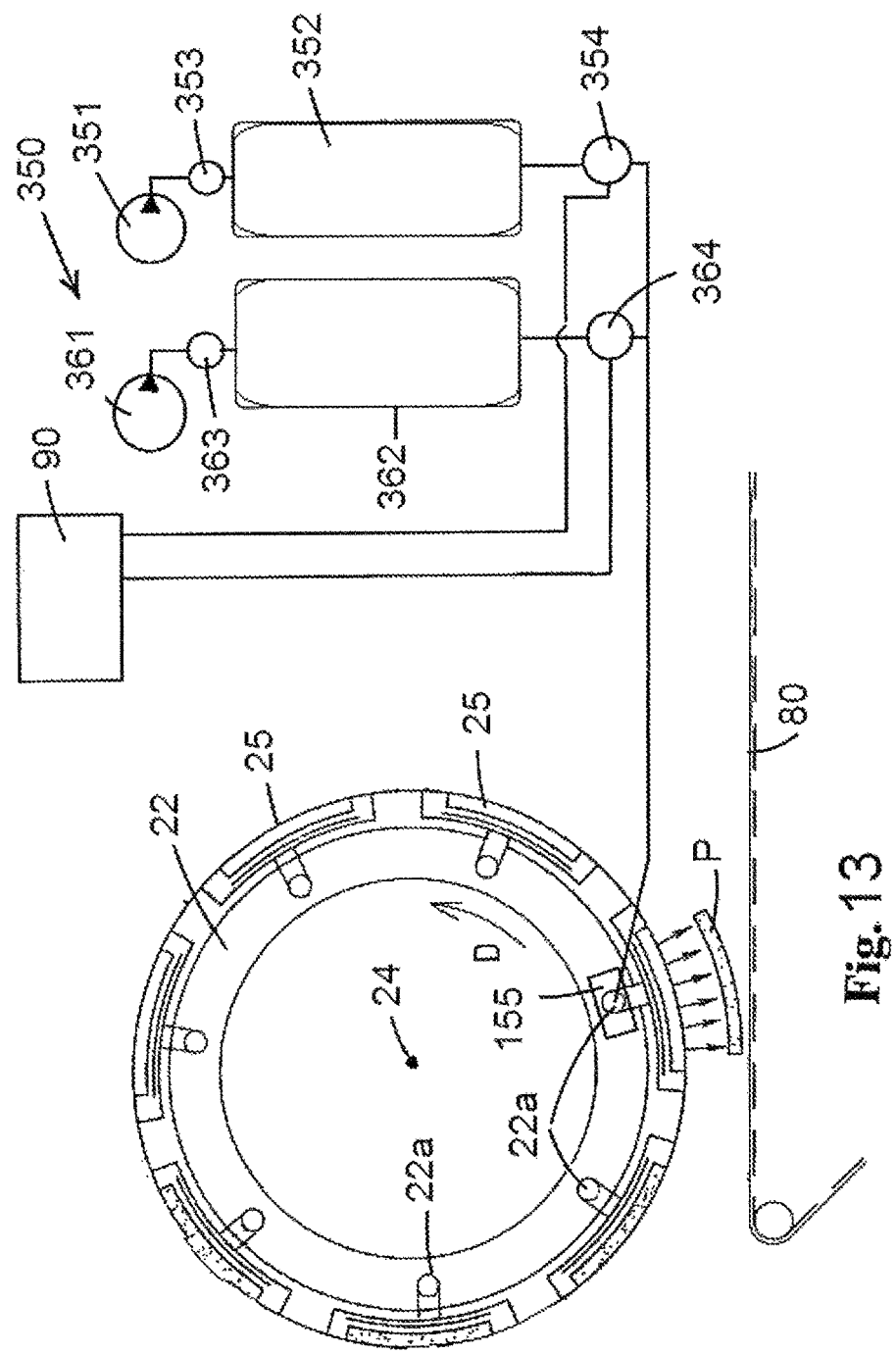

MOULDING FOOD PRODUCTS FROM A PUMPABLE FOODSTUFF MASS

CROSS-REFERENCE TO RELATED APPLICATIONS

This application is a Divisional of copending application Ser. No. 16/472,087, filed on Jun. 20, 2019, which is the National Phase under 35 U.S.C. § 371 of International Application No. PCT/NL2017/050861, filed on Dec. 21, 2017, which claims the benefit under 35 U.S.C. § 119(a) to patent application Nos. 2018037 and 2018038, filed in The Netherlands on Dec. 21, 2016, all of which are hereby expressly incorporated by reference into the present application.

The present invention relates to installations and methods for moulding food products from a pumpable foodstuff mass, e.g. ground meat. The invention is advantageously employed for the manufacture of meat products from a pumpable meat mass, e.g. a ground beef mass, for the manufacture of meat patties.

Figure 1:
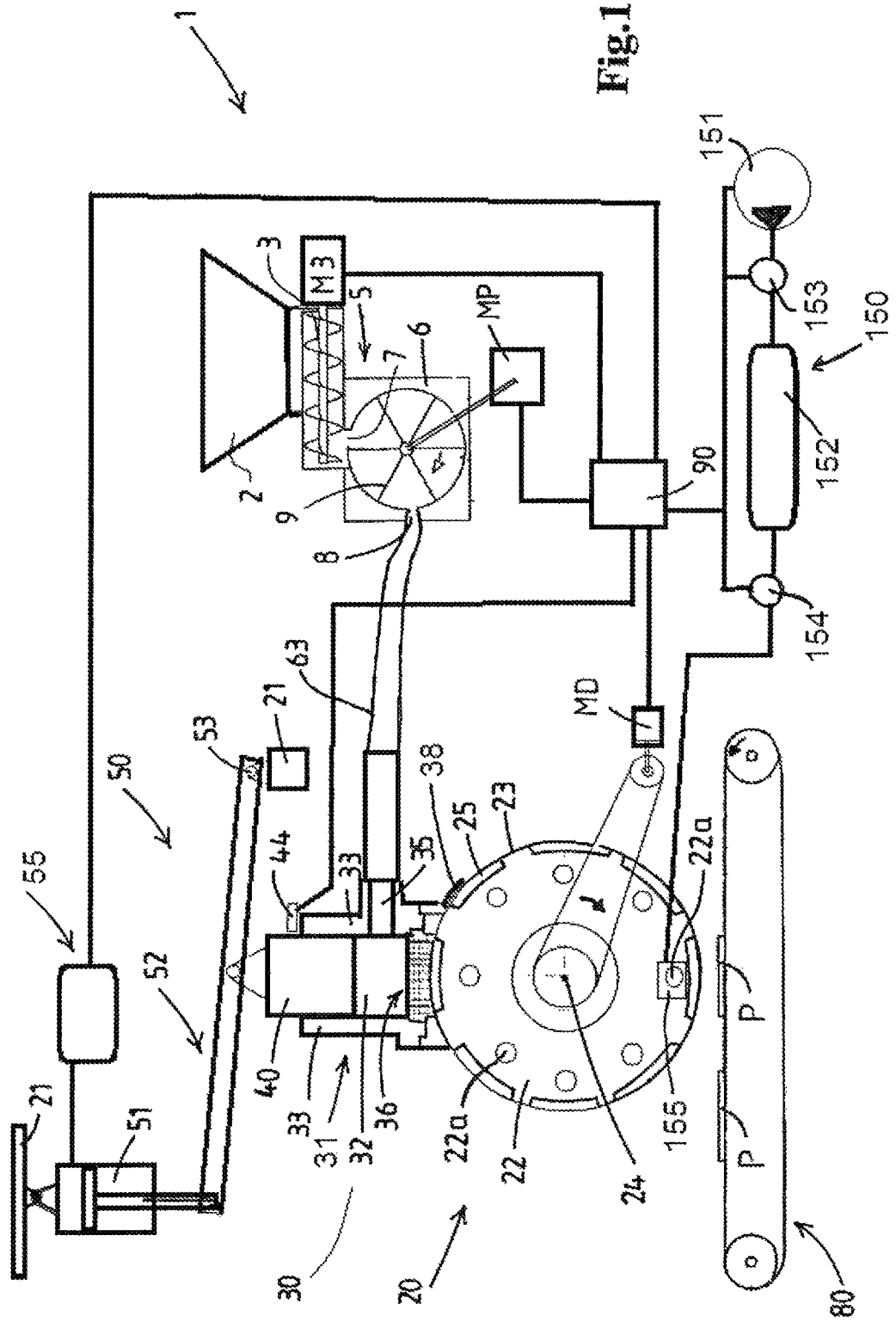
Figure 12:
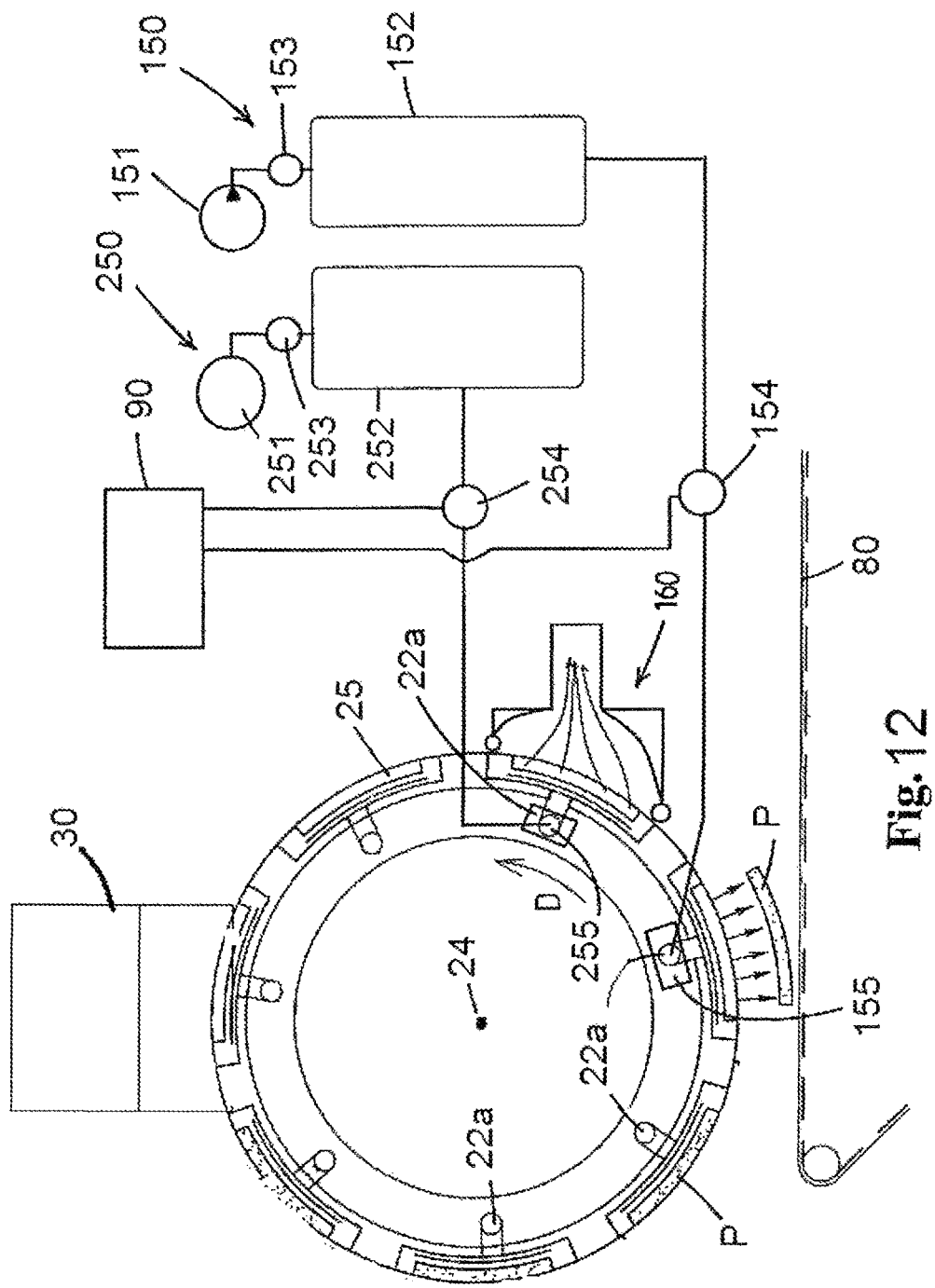

A known method for manufacture of e.g. meat patties, e.g. as disclosed in WO2015/012690, see e.g. FIGS. 1, 12, 13 thereof, involves the use of an installation having a frame and a mould drum with an outer circumferential drum surface and a longitudinal drum rotation axis. This axis is horizontal. The drum is rotatably supported by the frame to revolve about the drum rotation axis. The drum has in the drum surface rows of multiple mould cavities, each having a filling opening for the introduction of foodstuff mass, e.g. ground beef mass, into the mould cavity. A mould drum drive is coupled to the drum to drive the drum in a rotation direction.

A mass feed member is stationary arranged at a fill position. This mass feed member is connected to the outlet of the feed pump. The mass feed member has a housing defining an elongated chamber with a longitudinal axis. This housing has a pair of spaced apart long lateral walls having a length and generally parallel to the longitudinal axis, short end walls interconnecting said lateral walls at respective longitudinal ends thereof, and a bottom wall facing the mould drum.

The bottom wall is provided with an orificed discharge mouth formed by multiple discharge orifices. The totality of the discharge mouth spans the path of the multiple mould cavities in the rows, so that foodstuff mass flows from said one chamber into the mould cavities that make up a row via the discharge mouth. The mass feed member is thus adapted to transfer foodstuff mass from the chamber into the passing rows of mould cavities of the mould drum when the filling openings of a row of mould cavities are in communication with the discharge mouth at said fill position.

The mass that has been filled into a mould cavity remains in said cavity for a while as the drum is moved on towards a release or ejection position of the formed products. In embodiments the installation has a closure member that extends in downstream direction from the mass feed member at the fill position and temporarily keeps the filled mould cavities closed downstream of the fill position, e.g. to allow the mass to become a more coherent food product.

The mass in the mould cavity forms the food product, e.g. the meat patty.

The known installation comprises a feed pump that is connected to the inlet of the mass feed member.

A food products release or knock-out mechanism is provided, e.g. associated with the mould drum, and is adapted to cause or facilitate removal of the food product at a product removal position that is downstream of the fill position. It is for example known to provide air channels in the drum that extend to the cavities and allow to selectively introduce air that has been supplied from a manifold at a head end of the drum via said channels to between the drum and the product in order to facilitate the release thereof from the mould cavity. Other release or removal mechanisms, e.g. using a mechanical ejector, are also known in the art.

The production of moulded food products, e.g. of meat patties, with such installations generally includes:
 driving the drum in its rotation direction, e.g. in a continuous, non-interrupted manner or in a manner with cyclic variation of drum rotation speed, or even in start-stop manner;
 operating the feed pump so as to feed foodstuff mass to the mass feed member and establish a foodstuff mass pressure in the chamber of said mass feed member by means of said feed pump,
 transfer of pressurized foodstuff mass via the mouth into each passing mould cavity,
 release of the moulded products from the mould cavities, e.g. by air ejection.

As discussed in WO2015/012690 the use of long drums with multiple cavities in each row, e.g. drums of 500 mm length or more, e.g. of 1000 mm or even more, allows to achieve increased capacity. Often the mould cavities are arranged in straight or rectilinear rows of multiple mould cavities, said rows being parallel to the drum axis with the rows being offset from one another in circumferential direction. It is also common in such prior art mould drums that all mould cavities are of identical dimensions, e.g. circular contoured cavities, although other embodiments with non-identical cavities are known as well. Examples of known high capacity food product moulding installations and methods are found in e.g. WO 0030458 and WO2004002229.

In general drum type moulding installations allow for a high production capacity compared to well known slide-plate moulding devices, wherein a cyclically driven mould plate with a row of mould cavities is cycled back and forth between a fill position and a release or knock-out position. At the fill position the row of mould cavities in the reciprocating plate is filled with foodstuff mass. This is for example illustrated in U.S. Pat. No. 4,356,595.

In WO2015/012690 the issue of non-uniformity of the finally obtained food products is addressed, e.g. with regard to their appearance and shape. For instance in practical use of a high capacity drum mould device it is observed that in a batch of circular meat patties that are made of ground meat there are visible deviations from the circular contour of the mould cavities. These shape deviations are also non-consistent within the batch.

In WO2015/012690 it is proposed to provide mobile grinders that subject the foodstuff mass in the mass feed member to a grinding step prior to transfer into the mould cavities. Whilst this approach offers advantages, the grinding effectively changes the composition of the foodstuff mass which requires that the earlier preparation of the mass takes said final grinding into account. This may be difficult in practice, e.g. as it differs significantly from current practice.

Therefore, as an alternative to said grinding solution or in order to be combined therewith, the present invention aims to propose measures that resolve, or at least reduce, undesirable non-uniformity of the moulded food products, for example of products that have been obtained with a high capacity drum moulding installation. The non-uniformity may relate to the shape but also to other aspects of the product, e.g. the composition, such as the density, which may influence other aspects like the later cooking or frying, or the taste in general.

The present invention amongst others aims to provide measures that allow for enhanced versatility and/or control with regard to the characteristics of the formed product, e.g. in view of the above mentioned density, texture, taste, frying behaviour, etc.

The present invention also aims to provide alternative mass feed members to be used in a moulding device for food products, which mass feed members may be used to attain one or more of the above aims.

The invention is primarily aimed at products formed of ground meat mass, e.g. beef, poultry meat, pork meat, but is also seen as of interest for other foodstuff masses, e.g. fibrous foodstuff masses. For example the foodstuff mass may include, or primarily be composed of, foodstuff like fish meat, potatoes, rice, (leguminous) vegetables (e.g. soy), seaweeds, nuts, fungi, etc.

According to a first aspect thereof the invention provides an installation for moulding of three dimensional products from a mass of pumpable foodstuff material, for example from ground meat, wherein the installation comprises:
a feed pump for the foodstuff mass,
a feed pump drive,
a moulding device comprising:
  a frame,
  a mobile mould member having multiple mould cavities, each having a filling opening for the introduction of foodstuff mass into the mould cavity, wherein the mould member is movably supported by the frame to move along a path, and wherein multiple mould cavities are arranged in a pattern that includes mould cavities arranged at distinct positions in a perpendicular axis direction which is perpendicular to the path of the mould member,
  a mould member drive adapted to move the mould member along said path,
  a mass feed member arranged at a fill position relative to the path of the mobile mould member, which mass feed member is connected to an outlet of the feed pump, said mass feed member having a housing defining an elongated chamber with a longitudinal chamber axis extending in said perpendicular axis direction, said housing having a pair of spaced apart long lateral walls having a length and generally parallel to said longitudinal chamber axis, short end walls interconnecting said lateral walls at respective longitudinal ends thereof, a bottom wall facing the mould member,
and wherein said bottom wall is provided with a discharge mouth formed by one or more discharge openings spanning the path of said multiple mould cavities in said perpendicular axis direction, so that foodstuff mass flows into said mould cavities via said discharge mouth during operation of the moulding device,
characterized in that
the mass feed member is provided with a single elongated plunger that is slidably received in said chamber, sliding between said lateral walls and said end walls, generally opposite the bottom wall, in a range of travel of said plunger relative to said bottom wall, said range of travel being bounded by an upper limit and a lower limit,
wherein the installation comprises a plunger pressurizing assembly adapted to cause said plunger to be biased towards said bottom wall at a controllable pressure,
wherein at least one lateral wall is provided with an introduction mouth for introduction of food stuff mass into the chamber, said introduction mouth being formed by one or more introduction openings spanning at least a major portion of the length of said lateral wall, e.g. said one or more introduction openings combined having a length of about the length of the chamber, said lateral walls and end walls each having a portion that extends above said introduction mouth,
wherein the installation comprises a plunger position sensor that is adapted to provide a plunger position signal corresponding to one or more positions of said plunger, e.g. including an upper position and a lower position of said plunger,
wherein the installation comprises a controller which is linked to said plunger pressurizing assembly, to said plunger position sensor, and to said feed pump, which controller is adapted to input a target fill pressure for the foodstuff mass in the chamber of the mass feed member and/or in the mould cavities,
and wherein the controller is adapted, e.g. a computerized controller is programmed, to operate the plunger pressurizing assembly such that said foodstuff mass within said chamber is kept pressurized at a substantially constant pressure by means of said single elongated plunger on the basis of the inputted target fill pressure,
wherein said controller is adapted to control the introduction of foodstuff mass into the chamber on the basis of the plunger position signal, wherein said introduction of foodstuff mass by means of the feed pump causes the plunger to move away from the bottom wall.

For example the controller is programmed to start the introduction of foodstuff mass when said plunger reaches a predetermined lower position near or at a lower limit of said range of travel and said introduction being stopped when said plunger reaches an upper position near or at an upper limit of said range of travel.

It has been found that the combination of technical features listed in the characterizing portion of the claim provides enhance uniformity of the shape of the products as well as enhanced quality, e.g. in terms of texture, density, etc.

The single elongated plunger as it were forms a movable roof of the chamber, that comes down constantly on all of the foodstuff mass in the chamber. The mass is generally introduced into the chamber over the whole length of the lateral wall chamber, at least over the majority of said length, e.g. at least 75% thereof, and in a generally sideways direction. In contrast, introducing the mass from above via a narrow inlet and pressurizing the foodstuff mass with multiple circular plungers in a row over the length of the chamber as e.g. proposed in U.S. Pat. Nos. 5,618,571 and 5,795,610 does create locally significant pressurization variations and undue shear in the mass and thus seems to worsen the problems addressed above.

Repeated filling of cavities, e.g. of rows of cavities, causes the chamber to become less full and the plunger to sink into the chamber. This is sensed by the position sensor and at a suitable moment, e.g. when reaching a preset lower limit of the range of travel, the feed pump is started to refill the chamber. The feed pump is embodied to fill said chamber whilst the plunger keeps the mass pressurized as the process of filling of mould cavities is continued during the refilling of the chamber. The filling is continued until a preset level of the plunger is reached, e.g. detected by the position sensor. As the inflow of mass into the chamber is via the lengthy introduction mouth in a lateral wall, this inflow does not unduly disturb the homogeneity of the mass in the chamber in a manner so that this does not impair the product uniformity and quality, e.g. when seen of the mould cavities in a row and/or comparing one row of products to a later moulded row of products.

In embodiments it is envisaged that even in the lower limit position the plunger does not block the introduction opening, so that this opening remains in open communication with the chamber at all times. For example no overlap will occur between the plunger in or near its lower limit and the introduction opening. Or, in other embodiments, the plunger could overlap or obscure a part of the introduction mouth, so reducing its effective outflow yet no closing or blocking said outflow. These arrangements guarantee the effective inflow of mass into the chamber via the introduction mouth once the controller has established on the basis of the plunger position signal that the chamber needs to be replenished with foodstuff mass.

In practice the chamber may e.g. have a length between 500 and 1000 mm, e.g. with a width between 100 and 250 mm. For example the width of the chamber is between 120 and 180 mm.

For example the introduction mouth is embodied as a singular slot in the lateral wall, said slot having a length generally corresponding to the length of the chamber and having a height that may in practical embodiments may between 20 and 60 mm. For example the introduction mouth has a height between of 30 mm plus the thickness in mm of the thickest products to be produced with the installation.

In embodiments the introduction mouth has a lower edge that is vertically spaced from the bottom wall 36 of the chamber, e.g. said vertical spacing being between 20 and 50 mm in practical embodiments. In combination with a lowermost position of the plunger such that the outflow of mass from the introduction mouth is never fully blocked, e.g. at most the plunger overlapping a top region of the introduction mouth in its lowermost position, this vertical spacing of the introduction mouth serves to keep a portion of mass above the discharge mouth that is not unduly affected by the inflow of mass into the chamber.

The range of travel of the plunger in practical embodiments of the first aspect of the invention may be between 50 and 150 mm.

In view of uniformity of the pressurization of the mass within the chamber and the desired outflow via the discharge mouth it is preferred that, considering said plunger has an imaginary unobstructed projection on the bottom wall seen in direction of travel of said plunger, to locate the discharge mouth fully within this imaginary unobstructed projection of the plunger. So the plunger most effectively acts to press the mass into the one or more openings of the discharge mouth, with the single plunger acting on all of said mass in the chamber in an even manner.

In an embodiment the direction of travel of the plunger is perpendicular to the bottom wall of the mass feed member housing. For example the direction of travel of the plunger is vertical.

In an embodiment the plunger comprises a metal plunger body that is covered on a side facing the chamber by a plastic cover member, e.g. like a tray, said plastic cover member possibly simultaneously forming a peripheral seal between said plunger body and the housing or one or more separate sealing members being arranged around the periphery of the plunger to seal relative to the lateral walls and the end walls of the housing.

Preferably the face of the plunger is substantially planar and oriented at right angles to the travel direction of the plunger.

In an embodiment the lateral walls and the end walls of the mass feed member housing are made of metal, e.g. of stainless steel, e.g. a cast or welded metal housing structure. In an embodiment the bottom wall comprises a slot wherein an exchangeable mouth body can be arranged, allowing to alter the discharge mouth without having to change the entire mass feed member, e.g. when also exchanging the mould member for another mould member, e.g. one drum for a drum with another pattern of mould cavities and shapes of mould cavities.

In an embodiment a lateral wall comprises an exchangeable introduction mouth body forming the introduction mouth, e.g. allowing to change the effective opening of the introduction mouth by replacing one such mouth body for another mouth body. For example one could provide introduction mouth bodies of plastic, that are to be retained in a mass feed member housing of metal. It may be easier to provide the desired introduction mouth in a plastic body than in a metal housing.

In another embodiment one could envisage that the housing of the mass feed member, e.g. of metal, is adapted to mount therein an exchangeable body forming both the discharge mouth (or at least part thereof) and the introduction mouth of the mass feed member, e.g. said exchangeable body being made at least in part of plastic.

In an embodiment it is envisaged that the mass feed member housing and plunger are both, preferably as a unit, exchangeable mounted in the moulding device, allowing to change this corresponding set of components, e.g. as a unit, for another set of mass feed member housing and plunger, e.g. dependent on the type of foodstuff mass to be handled by the installation.

In an embodiment the introduction mouth is a singular elongated slotted passage or a series of passages distributed along the length of the lateral wall. The extension in longitudinal direction optimally equals the length of the plunger, so that mass flows evenly distributed into the chamber underneath the plunger. The length of the introduction mouth may be shorter when needed, e.g. in view of structural restraints, yet preferably is at least 75% of the length of the plunger.

In an embodiment the pressurizing assembly is embodied to provide a substantially constant pressurization over the range of travel of the plunger, enhancing uniformity, texture, and quality of the moulded products, e.g. when making products of ground meat.

In an embodiment the pressurizing assembly is adapted to create an adjustable pressure of the mass in the chamber up to 15 or 20 bars, e.g. the controller allowing setting this pressure in a range of up to 20 bars, e.g. the pressure being set to above 10 bars when use is made of an orificed mouth body, e.g. for handling of ground beef and desiring to produce home-style type meat patties.

In a very practical embodiment the pressurizing assembly comprises one or more pneumatic actuators, so that setting an air pressure for said one or more actuators creates the pressurization of the mass in the chamber. This can be effectively done in practice, using an air compressor, a pressure vessel filled by said compressor, and an air pressure regulator to cause air at an adjustable pressure to be supplied to said one or more pneumatic actuators. The air pressure regulator can be of an electronic type to be linked to a computerized controller.

In an embodiment the one or more pneumatic actuators of the pressurizing assembly engage on a lever arm structure that is hinged to the frame at a hinge point. This lever arm structure being connected to said plunger so as to obtain amplification of a force exerted by the one or more pneumatic actuators, e.g. in view of obtaining a mass pressure above 10 bars in the chamber.

In an embodiment the bottom wall has a slot wherein an exchangeable discharge mouth body is received so as to allow exchange of one discharge mouth body for another discharge mouth body having a different discharge mouth, e.g. a discharge mouth body having an orificed discharge mouth and a discharge mouth body having a single rectilinear slot discharge mouth.

In an embodiment, e.g. for handling ground beef, the bottom wall of the housing of the mass feed member is provided with an orificed mouth body having multiple outlet orifices forming the discharge mouth so that said foodstuff mass flows into each mould cavity via multiple outlet orifices.

In an embodiment the orificed mouth body is associated with an orificed valve plate having multiple orifices, which valve plate is movable by a valve plate actuator in its plane between opened and closed positions wherein said orifices are respectively aligned and non-aligned with said orifices in said mouth body.

In an embodiment of the mould member, e.g. a moulding drum, multiple mould cavities are arranged in one or more rows of multiple mould cavities, where each row is arranged perpendicular to the path of the mould member. When use is made of a plate valve, the controller is then preferably linked to the plate valve actuator and is adapted to bring this valve in opened position when a row of mould cavities is aligned with said orificed mouth body so that said pressurized foodstuff mass flows into this row of mould cavities and adapted to bring the valve in closed position after filling of said row of mould cavities has been completed.

In an embodiment, the mould member is a reciprocating mould plate having one or more rows of mould cavities as is known in the art.

In a preferred embodiment the mould member is a mould drum, which mould drum has an outer circumferential drum surface and a horizontal longitudinal drum rotation axis, wherein the drum is rotatably supported by the frame to revolve about the horizontal axis, wherein the mould drum has in said drum surface said pattern of multiple mould cavities, which pattern includes multiple rows of mould cavities, which rows are spaced apart in circumferential direction and generally parallel to said drum rotation axis, wherein each row comprises multiple cavities at said distinct perpendicular axis positions.

As is apparent from the description of the prior art both in drum moulding devices and in plate member moulding devices it is well-known to have a pattern of mould cavities so that—seen perpendicular to the path of the mobile mould member—there are cavities at spaced apart locations.

In a practical embodiment the mould cavity pattern is composed of mould cavities of identical dimensions, e.g. to mould meat patties with circular contour.

With regard to the pattern of mould cavities this invention allows for all sorts of patterns including the presently most common design of mould drums for high capacity moulding devices, which drums have a pattern of rectilinear rows of mould cavities, which rows are parallel to the drum rotation axis, in combination with a mouth, e.g. single slot or orificed, of the mass feed member that is in essence parallel to the rotation axis. This design entails that in each row the multiple mould cavities come into communication with the mouth of the mass feed member at the same time and the filling events take place simultaneously.

One can also envisage that at one such "perpendicular axis location" the one or more cavities are differently shaped than at one or more other "perpendicular axis locations". For example for small size products, e.g. nuggets or smaller soup meat products, this may be of interest and a deliberately selected variety of moulded products can be created which may be attractive to consumers.

Other patterns, e.g. with the mould cavities of a drum arranged in a pattern of helically extending rows or a staggered arrangement, with one cavity being offset in circumferential direction with regard to the axially neighbouring cavity, are also possible.

In an embodiment—in a drum moulding device—the drum is driven in its rotation direction in a continuous, non-interrupted manner. This is possibly at a constant rotational speed during a revolution of the drum, but one can also envisage a drum drive and controller that cause a periodic variation of the drum rotational speed during a revolution, e.g. increasing the drum speed in an approach period when a row of cavities to be filled nears the discharge mouth or is already in first overlap therewith and slowing down or stopping the drum when the major portion or the entirety of the filling event takes place, e.g. when the effective filling opening formed by the overlap of the mouth and the filling opening of the mould cavity is the greatest.

In an embodiment the controller is linked to the drive, e.g. including a servo-controlled electric motor, of the mould drum, wherein the controller is adapted to stop or lower the rotation speed when a row of mould cavities is aligned with the discharge mouth. This allows the filling event to take place virtually with the mould cavity at standstill or moving slowly.

In an embodiment the feed pump is a positive displacement feed pump, e.g. a rotary vane pump, a rotary lobe pump, a piston pump.

In an embodiment the housing has an introduction mouth in each lateral wall thereof, wherein a valve is associated with each of said introduction mouths, which valve is operable to open and close the respective introduction mouth. Each valve comprises a valve actuator.

In an embodiment a first piston pump is mounted onto a first lateral wall of the housing and a second piston pump is mounted onto a second lateral wall of the housing. Herein each of said first and second piston pumps preferably has a single pump piston that is reciprocable in a pump chamber having a length in said longitudinal direction that substantially corresponds to said length of said introduction mouth.

In another embodiment the two introduction mouths are connected to a common manifold that connects to a single pump, e.g. a vane pump or the like. The use of piston pumps, each connected directly to a respective introduction mouth and preferably having a single plunger with a length that corresponds substantially to the length of the introduction mouth.

In an embodiment first and second piston pumps are arranged in a V relative to the mass feed member housing provided with two introduction openings at opposite sides of the chamber, wherein the first and second piston pumps are each connected to a respective foodstuff mass inlet duct. These inlet ducts are preferably arranged in an inverted V and adjoin one another at a common hopper that is adapted to receive therein a supply of a foodstuff mass. This embodiment resembles the V-arrangement of pumps and common hopper as disclosed in WO2015/012690 which is incorporated herein by reference.

Technical features discussed in said WO2015/012690 may be incorporated in the present invention, e.g. the inlet ducts each having a length in the longitudinal direction of the mass feed member that substantially corresponds to the length of the introduction mouth to which the respective piston pump is connected.

In an embodiment the discharge mouth is composed of multiple outlet orifices, preferably rather small diameter orifices, for example orifices having a diameter in the range between 2 and 6 millimeters. The orifices can for example be evenly distributed over the length of the mouth, e.g. in a rectangular grid, or may be grouped, e.g. in circular groups, e.g. corresponding to the location of the circumferential arrays of mould cavities on the drum.

The outlet orifices in the orificed mouth body are advantageously dimensioned and oriented so as to obtain a desired inflow of mass into the mould cavity. For example some of the outlet orifices may have an inclination so that the mass enters into the mould cavity at an oblique angle, e.g. some outlet orifices having a component that is directed counter to the mould member motion and/or some orifices may have an inclination directed along the mould member motion. Some outlet orifices may be directed at right angles to the path of the mould member motion. Some outlet orifices may be directed to emit mass towards a circumferential wall portion of the mould cavity, whereas other outlet orifices are directed to emit mass towards a centrally located bottom wall portion of the mould cavity.

The skilled person may also vary the cross-section and cross-sectional shape of the outlet orifices, e.g. with smaller orifices that provide the mass to form an outer region of the product (e.g. a circumferential region of a meat patty) and with larger orifices that provide mass to form an inner region of the product. Also the cross-section and orientation may vary over the length of an outlet orifice, e.g. with sections that are angled with respect to one another.

In a further advantageous embodiment an orificed mouth body is provided with a valve, e.g. incorporated in the orificed mouth body, which valve is adapted to open and close orifices in the orificed mouth body. This allows a valve action that is used to trigger the start of a filling event.

In a practical embodiment the valve comprises an orificed valve plate that is movable in its plane between an opened and closed position. For example the orificed valve plate is also allows to avoid any clogging of orifices and so assures the reliable passage of mass via the mouth body into the mould cavities. The motion of the valve plate between its opened and closed position may be in the mentioned perpendicular axis direction, but could e.g. also be at right angles thereto so in the direction of the path of motion of the mould member.

The valve plate orifices may be similar in cross-section to the adjoining outlet orifices in the mouth body, but one can also envisage that the valve plate orifices are differently shaped, e.g. slotted orifices in the valve plate and cylindrical orifices in the mouth body with the slots being longer than the diameter of the outlet orifices. For example the slotted orifices extend with their length in the mentioned perpendicular axis direction.

In a practical embodiment the orificed mouth body comprises a plastic orificed body part that forms an outlet face of the mouth body that is adjacent the path of the mould member, e.g. having a curved outlet face corresponding to the curvature of a mobile mould member embodied as a drum. The plastic embodiment allows for ease of manufacture and avoids undue wear of the mobile mould member.

In an embodiment the installation comprises a foodstuff mass pressure sensor that is adapted to sense the actual pressure of the foodstuff mass in the chamber of the mass feed member, preferably the sensor being arranged directly on or in the chamber. The installation comprises a controller that is connected to said foodstuff mass pressure sensor, preferably an electronic controller.

An embodiment comprises selecting a target pressure or target pressure range for the foodstuff mass in the chamber, e.g. based on test runs performed with such foodstuff mass on the device, or based on historical data (e.g. from the manufacturer of the device or other food product manufacturers) and setting the pressurizing assembly accordingly.

As explained the mould drum devices are predominantly chosen for their high capacity. This capacity can amongst others be enhanced by increasing the length of the drum so as to mould more food products with a single drum. This is seen as beneficial for large capacity food producing installations, e.g. as the moulded food products may be received on a conveyor of significant width, e.g. of 0.8 or 1.0 meter that passes into a further treatment device, e.g. into an oven or a fryer. The method according to the invention may include the step of conveying the formed products to an oven or fryer, and subjecting the products therein to an oven treatment or frying the product.

In view of increasing the length of the drum the invention, in an embodiment thereof, envisages an installation comprising not just a single mass feed member at the fill position, but with at least a first and a second mass feed members that are arranged at the fill position in side by side arrangement. Herein each mass feed member has a chamber therein for the mass that is separated from the chamber of the other mass feed member, possibly with a first and a second pump respectively connected to the first and second mass feed member, or, with multiple mass feed members connected to the same pump. The installation has a single mould drum with a first section of the drum surface passing along the first mass feed member and a second section passing along the second mass feed member during revolution of the drum. The mould cavities of said single drum are filled by said first and second mass feed members, wherein each of the first section and the second section of the drum surface have multiple mould cavities that are arranged in a mould cavities pattern for each drum surface section with cavities at multiple (at least two, e.g. four or more) longitudinal positions when seen in longitudinal direction of the drum and at multiple circumferential position when seen in circumferential position of the drum.

The first aspect of the invention also relates to a method for moulding of three dimensional products from a mass of pumpable foodstuff material, for example from ground meat, wherein use is made of an installation as described herein.

The feed pump is operated so as to feed foodstuff mass to the mass feed member. The pump preferably is a positive displacement pump, e.g. a rotor pump having a rotor with vanes that revolves in a pump chamber having an inlet and an outlet, or a rotary lobe pump, or a piston pump, etc.

The feed pump may be connected at its inlet to a hopper that is adapted to receive therein a batch of pumpable foodstuff mass, e.g. ground meat. The hopper may be evacuated to reduce the inclusion of air in the mass.

In a practically preferred embodiment of the invention the mass feed member comprises a funnel body that connects to the introduction mouth of the mass feed member. The funnel body e.g. has main walls of substantially triangular shape that are connected along their sides, with the inlet arranged at an apex of said main walls that is located opposite said lateral wall containing said introduction mouth.

The present invention also relates to a method for moulding meat products, e.g. hamburger patties, from a pumpable ground meat mass, wherein use is made of a moulding installation for moulding meat products from a pumpable ground meat mass.

The present invention also relates to an installation having a computer control for the drum rotation, operation of the pump, said control e.g. being programmed to perform the inventive methods, e.g. with a memory containing predetermined routines that make the installation perform the inventive methods for selected foodstuff masses and products to be formed.

According to a second aspect thereof the present invention provides an installation for moulding of three dimensional products from a mass of pumpable foodstuff material, for example from ground meat, wherein the installation comprises:
- a feed pump for the foodstuff mass,
- a feed pump drive,
- a moulding device comprising:
  - a frame,
  - a mobile mould member having multiple mould cavities, each having a filling opening for the introduction of foodstuff mass into the mould cavity, wherein the mould member is movably supported by the frame to move along a path, wherein the multiple mould cavities are arranged in one or more rows of multiple cavities each, wherein the cavities in a row are located at distinct positions in a perpendicular axis direction which is perpendicular to the path of the mould member,
  - a mould member drive for moving the mould member along a path,
  - a mass feed member arranged at a fill position relative to the path of the mobile mould member, which mass feed member is connected to an outlet of the feed pump, said mass feed member having a housing defining an elongated chamber with a longitudinal axis extending in said perpendicular axis direction, said housing having a pair of spaced apart long lateral walls having a length and generally parallel to said longitudinal axis, short end walls interconnecting said lateral walls at respective longitudinal ends thereof, a bottom wall facing the mould member at the fill position along the path of the mould member, and wherein said bottom wall is provided with a discharge mouth formed by one or more discharge openings spanning the path of said one or more rows of multiple mould cavities, so that foodstuff mass flows into each row of mould cavities via said discharge mouth, characterized in that the mass feed member is provided with a single elongated plunger that is slidably received in said chamber, sliding between said lateral walls and said end walls, generally opposite the bottom wall, wherein the mass feed member comprises a plunger pulsing assembly adapted to cause periodic pulsating motions of said plunger in a range of travel of said plunger towards said bottom wall in synchronicity with the successive alignments of successive rows of mould cavities with said discharge mouth, wherein at least one lateral wall is provided with an introduction mouth formed by one or more introduction openings spanning a major portion of the length of said lateral wall, said lateral wall having a portion that extends above said introduction mouth, wherein the mass feed member further comprises a valve associated with said introduction mouth and operable to open and close said introduction mouth, said valve comprising a valve actuator, wherein the installation comprises a controller which is linked to said plunger pulsing assembly, to said valve actuator, and to said feed pump, which controller is adapted, e.g. a computerized controller is programmed, to operate said valve so that said valve opens and closes in synchronicity with the successive alignments of rows of mould cavities with said discharge mouth and with successive pulse motions of the plunger, such that said valve is closed when a row of mould cavities is aligned with said discharge mouth, and wherein the controller is adapted to operate the plunger pulsing assembly such that, with said valve being closed, the single elongated plunger performs a pulse motion towards said bottom wall thereby causing a pressure pulse in said foodstuff mass in said chamber and transfer of foodstuff mass into the row of mould cavities that is aligned with said discharge mouth, which controller is adapted to open the valve between successive pulse motions of the plunger and operate the feed pump such that said feed pump then replenishes the chamber with said foodstuff mass.

As will be appreciated the mass feed member of this installation is also provided with a plunger that slides in the housing as described with reference to the first aspect of the invention.

In contrast to keeping the mass in the chamber pressurized by a pressurizing assembly as in the first aspect of the invention, the second aspect provides for the creation of pressure pulses on the mass in the chamber which is effectively closed at the introduction mouth so that said pressure pulse is not dampened by mass present in the trajectory between the introduction mouth and the feed pump. The pulses are timed or synchronized with the filling of rows of cavities, so that each pulse causes the filling of a row of cavities. This approach may be advantageous for certain foodstuff masses and/or products to be formed, e.g. at high production rates. For example the approach may be advantageous for production of home-style ground meat patties, wherein the mouth is an orificed mouth so that the patty is basically composed of small columns of ground meat.

In an embodiment the plunger pulsing assembly comprises one or more pneumatic bellow actuators, that are known for their ability to create repeated high impact forces on demand. One drawback of this pneumatic pulsing is the corresponding consumption use of pressurized air yet the use of pneumatics is practically simple and robust. In comparison the setting of pressure by means of one or more pneumatic actuators in the pressurizing assembly hardly consumes pressurized air.

The pulsing of the second aspect of the invention may also be caused by some non-pneumatic mechanical drive, e.g. using an excenter mechanism, for the plunger, e.g. with an adjustable stroke length of the pulse motion effected by the plunger.

A third aspect of the invention relates to an installation for moulding of three dimensional products from a mass of pumpable foodstuff material, for example from ground meat, wherein the installation comprises:
- a feed pump for the foodstuff mass,
- a feed pump drive, a moulding device comprising:
a frame,
a mobile mould member having multiple mould cavities, each having a filling opening for the introduction of foodstuff mass into the mould cavity, wherein the mould member is movably supported by the frame to move along a path, and wherein multiple mould cavities are arranged in a pattern that includes mould cavities arranged at distinct positions in a perpendicular axis direction which is perpendicular to the path of the mould member,
a mould member drive adapted to move the mould member along said path,
a mass feed member arranged at a fill position relative to the path of the mobile mould member, which mass feed member is connected to an outlet of the feed pump, said mass feed member having a housing defining an elongated chamber with a longitudinal chamber axis extending in said perpendicular axis direction, said housing having a pair of spaced apart long lateral walls having a length and generally parallel to said longitudinal chamber axis, short end walls interconnecting said lateral walls at respective longitudinal ends thereof, a bottom wall facing the mould member,
and wherein said bottom wall is provided with a discharge mouth formed by one or more discharge openings spanning the path of said multiple mould cavities in said perpendicular axis direction, so that foodstuff mass flows into said mould cavities via said discharge mouth during operation of the moulding device,
characterized in that
the mass feed member is provided with an operable chamber pressurization member, e.g. a single plunger or multiple plungers (e.g. in a row), that is operable and operated to pressurize the mass within the chamber, e.g. performing a constant pressurization or a pulsing as described herein, wherein the housing of the mass feed member has a first introduction mouth in first lateral wall thereof and a second introduction mouth in second lateral wall thereof, and wherein a first valve is associated with said first introduction mouth and a second valve with said second introduction mouth, each of said first and second valve being controllable independently from the other valve to open and close the respective introduction mouth, each of said first and second valves comprising a respective valve actuator.

In the third aspect of the invention, for example, the operable chamber pressurization member can be different than a single plunger, e.g. multiple plungers, e.g. multiple plungers acting simultaneously. In another embodiment, for example, the operable chamber pressure member is an elongated and elastically expandable hollow member within the chamber that is expanded, e.g. periodically, by internal fluid pressure.

Preferably, in said third aspect of the invention, a first piston pump is mounted onto the first lateral wall of the housing and a second piston pump is mounted onto the second lateral wall of said housing, wherein each of said first and second piston pumps preferably has a single pump piston that is reciprocable in a pump chamber, preferably each piston having a length in said longitudinal direction that substantially corresponds to said length of said introduction mouth.

Preferably, in said third aspect of the invention, each introduction mouth is formed by one or more introduction openings spanning at least a major portion of the length of the respective lateral wall, e.g. said one or more introduction openings combined having a length of about the length of the chamber.

Preferably the operable pressure member is a single plunger as discussed with reference to the first and/or second aspect of the invention.

Preferably the installation comprises a plunger position sensor that is adapted to provide a plunger position signal corresponding to one or more positions of said plunger, e.g. including an upper position and a lower position of said plunger.

For example the installation comprises a controller as described with reference to the first or second aspect of the invention.

A fourth aspect of the invention relates to an installation for moulding of three dimensional products from a mass of pumpable foodstuff material, for example from ground meat, wherein the installation comprises:
a feed pump for the foodstuff mass,
a feed pump drive,
a moulding device comprising:
a frame,
a mould drum having an outer circumferential drum surface and a longitudinal drum rotation axis, the drum being rotatably supported by the frame to revolve about the drum rotation axis, wherein said outer circumferential surface comprises multiple mould cavities, each having a filling opening for the introduction of foodstuff mass into the mould cavity, wherein the multiple mould cavities are arranged in a pattern that includes mould cavities arranged at distinct positions in the direction of said longitudinal drum rotation axis,
a mould drum drive adapted to drive the mould drum in a rotation direction,
a mass feed member arranged at a fill position relative to the outer circumferential drum surface, which mass feed member is connected to an outlet of the feed pump, said mass feed member having a housing defining an elongated chamber with a longitudinal chamber axis extending in said direction of the longitudinal drum rotation axis, said housing having a pair of spaced apart long lateral walls having a length and generally parallel to said longitudinal chamber axis, short end walls interconnecting said lateral walls at respective longitudinal ends thereof, a bottom wall facing the mould member,
wherein said bottom wall is provided with a discharge mouth formed by one or more discharge openings spanning the path of said multiple mould cavities in said perpendicular axis direction, so that foodstuff mass flows into said mould cavities via said discharge mouth during operation of the moulding device,
a pressurized air food product ejection system, wherein the mould drum has air ducts that extend to said mould cavities and wherein at least a portion of the surface delimiting a mould cavity is air permeable, e.g. of porous material, wherein each of said air ducts is adapted to transport pressurized air to one or more of said mould cavities so that said air passes through said air permeable mould cavity surface portion,
and wherein said pressurized air food product ejection system further comprises a pressurized air source that is operable to feed pressurized air at a regulated ejection air pressure thereof to one or more of said air ducts associated with one or more mould cavities in a product release position thereof so as to facilitate and/or cause ejection of the moulded food product from said one or more mould cavities at said product release position, wherein the mass feed member is provided with a chamber pressurization member that is arranged within said chamber and is distinct from said feed pump and that is adapted and operable to pressurize the mass within said chamber, preferably said chamber pressurization member being embodied as a single elongated plunger that is slidably received in said chamber, sliding between said lateral walls and said end walls, generally opposite the bottom wall, in a range of travel of said plunger relative to said bottom wall, wherein the installation comprises a pressurizing assembly adapted to act on said chamber pressurization member to cause said pressurization of the mass within said chamber, for example a plunger pressurizing assembly adapted to cause said single elongated plunger to be biased towards said bottom wall at a controllable pressure, wherein at least one lateral wall is provided with an introduction mouth for introduction of food stuff mass into the chamber, said introduction mouth being formed by one or more introduction openings, preferably spanning at least a major portion of the length of said lateral wall, e.g. said one or more introduction openings combined having a length of about the length of the chamber, said lateral walls and end walls each having a portion that extends above said introduction mouth, a controller which is linked to said feed pump drive, pressurized air food product ejection system, and said pressurizing assembly, which controller is adapted to input a target fill pressure for the foodstuff mass in the chamber of the mass feed member and/or in the mould cavities, wherein the controller is adapted or configured, e.g. a computerized controller is programmed, to operate the pressurizing assembly such that said foodstuff mass within said chamber is pressurized, preferably at a substantially constant pressure, by means of said chamber pressurization member, e.g. said single elongated plunger, on the basis of the inputted target fill pressure, and wherein the controller is adapted to automatically set said ejection air pressure by said pressurized air source on the basis of the inputted target fill pressure.

Generally it is envisaged in embodiments of the fourth aspect of the invention that the controller will be adapted to automatically increase the ejection air pressure when the operator inputs an increased target fill pressure and the controller will automatically reduce the ejection air pressure when the operator inputs a reduced target fill pressure. This approach allows to safeguard proper air ejection as will be further explained herein.

It is noted that ejection air may also be a gas different from air, e.g. carbon dioxide gas, nitrogen gas, etc.

In an embodiment the installation comprises a single elongated plunger that is slidably received in said chamber, sliding between said lateral walls and said end walls, generally opposite the bottom wall, in a range of travel of said plunger relative to said bottom wall, and further comprises a plunger position sensor that is linked to said controller.

In an embodiment the controller is adapted to control the introduction of foodstuff mass into the chamber on the basis of the plunger position signal, wherein the introduction of foodstuff mass by means of the feed pump causes the plunger to move away from the bottom wall, e.g. said controller starting the introduction of foodstuff mass when said plunger reaches a predetermined lower position near or at a lower limit of said range of travel and said introduction being stopped when said plunger reaches an upper position near or at an upper limit of said range of travel.

In an embodiment of the fourth aspect of the invention the installation comprises said single elongated plunger that is slidably received in said chamber, sliding between said lateral walls and said end walls, generally opposite the bottom wall, in a range of travel of said plunger relative to said bottom wall, and further comprises a plunger position sensor that is linked to said controller, wherein said controller is adapted to control the introduction of foodstuff mass into the chamber on the basis of the plunger position signal, wherein said introduction of foodstuff mass by means of the feed pump causes the plunger to move away from the bottom wall, e.g. said controller starting the introduction of foodstuff mass when said plunger reaches a predetermined lower position near or at a lower limit of said range of travel and said introduction being stopped when said plunger reaches an upper position near or at an upper limit of said range of travel.

In an embodiment of the fourth aspect of the invention said plunger has an imaginary unobstructed projection on said bottom wall seen in direction of travel of said plunger, wherein said discharge mouth is located fully within said imaginary unobstructed projection of said plunger.

In an embodiment of the fourth aspect of the invention said direction of travel of the plunger is perpendicular to said bottom wall of said housing.

In embodiments the single elongated plunger as it were forms a movable roof of the chamber, that comes down constantly on all of the foodstuff mass in the chamber. The mass is generally introduced into the chamber over the whole length of the lateral wall chamber, at least over the majority of said length, e.g. at least 75% thereof, and in a generally sideways direction. In contrast, introducing the mass from above via a narrow inlet and pressurizing the foodstuff mass with multiple circular plungers in a row over the length of the chamber as e.g. proposed in U.S. Pat. Nos. 5,618,571 and 5,795,610 does create locally significant pressurization variations and undue shear in the mass and thus seems to worsen the problems addressed above.

Repeated filling of cavities, e.g. of rows of cavities, causes the chamber to become less full and the single elongated plunger to sink into the chamber. This may be sensed by a position sensor and at a suitable moment, e.g. when reaching a preset lower limit of the range of travel, the feed pump is started to refill the chamber. The feed pump is embodied to fill said chamber whilst the plunger keeps the mass pressurized as the process of filling of mould cavities is continued during the refilling of the chamber. The filling is continued until a preset level of the plunger is reached, e.g. detected by a position sensor. As the inflow of mass into the chamber is preferably done via the lengthy introduction mouth in a lateral wall, this inflow does not unduly disturb the homogeneity of the mass in the chamber in a manner so that this does not impair the product uniformity and quality, e.g. when seen of the mould cavities in a row and/or comparing one row of products to a later moulded row of products.

In some embodiments the inputted fill pressure may not be a single value but, for example, a value over time parameter, e.g. in the form of a profile or graph representing said value over time, e.g. over the period of time it takes to fill a mould cavity or a row of mould cavities.

For example the inventive installation of the fourth aspect of the invention will avoid the problematic situation that, during a production run, the operator inputs an increased target fill pressure which causes the plunger to effect said higher fill pressure, with the result being that the mass is stuck so hard in the mould cavity that the still unchanged air ejection is not capable to release the formed products, or not properly. In the prior art installation this problem may require stopping of the production, may require that incorrectly moulded products are removed, e.g. by hand, from the conveyor, etc. It is noted that in practical terms, the fill pressure may increase rather rapidly based on a new setting by the operator, e.g. within a few revolutions of the mould drum or even faster.

It is noted that setting the air ejection pressure at a high level in order to avoid the above problem from occurring all together, is no solution either, at least not a practical solution, as not only undue pressurized air consumption will take place but also products may become damaged due to being ejected by air at a too high pressure.

In an embodiment the installation of the fourth aspect of the invention comprises plunger position sensor that is linked to said controller, wherein said controller is adapted to control the introduction of foodstuff mass into the chamber on the basis of the plunger position signal, wherein said introduction of foodstuff mass by means of the feed pump causes the plunger to move away from the bottom wall, e.g. said controller starting the introduction of foodstuff mass when said plunger reaches a predetermined lower position near or at a lower limit of said range of travel and said introduction being stopped when said plunger reaches an upper position near or at an upper limit of said range of travel.

For example the controller is programmed to start the introduction of foodstuff mass when said plunger reaches a predetermined lower position near or at a lower limit of said range of travel and said introduction being stopped when said plunger reaches an upper position near or at an upper limit of said range of travel.

In embodiments of the fourth aspect of the invention it is envisaged that even in the lower limit position the plunger does not block the introduction opening, so that this opening remains in open communication with the chamber at all times. For example no overlap will occur between the plunger in or near its lower limit and the introduction opening. Or, in other embodiments, the plunger could overlap or obscure a part of the introduction mouth, so reducing its effective outflow yet no closing or blocking said outflow. These arrangements guarantee the effective inflow of mass into the chamber via the introduction mouth once the controller has established on the basis of the plunger position signal that the chamber needs to be replenished with foodstuff mass.

In an embodiment of the fourth aspect of the invention said introduction mouth is a singular elongated slotted passage or a series of passages distributed along the length of the lateral wall.

In an embodiment of the fourth aspect of the invention said pressurizing assembly comprises one or more pneumatic actuators, e.g. one or more pneumatic actuators engaging on a lever arm structure that is hinged to the frame at a hinge point, said lever arm structure being connected to said single elongated plunger so as to obtain amplification of a force exerted by said pneumatic actuators.

In an embodiment of the fourth aspect of the invention said bottom wall has a slot wherein an exchangeable discharge mouth body is received so as to allow exchange of one discharge mouth body for another discharge mouth body having a different discharge mouth, e.g. a discharge mouth body having an orificed discharge mouth and a discharge mouth body having a single rectilinear slot discharge mouth.

In an embodiment of the fourth aspect of the invention the bottom wall of said housing of said mass feed member is provided with an orificed mouth body having multiple outlet orifices forming the discharge mouth so that said foodstuff mass flows into each mould cavity via multiple outlet orifices. Possibly the orificed mouth body is associated with an orificed valve plate having multiple orifices, which valve plate is movable by a valve plate actuator in its plane between opened and closed positions wherein said orifices are respectively aligned and non-aligned with said orifices in said mouth body. As a variant thereof said multiple mould cavities may be arranged in one or more rows of multiple mould cavities, where each row is arranged substantially parallel to the longitudinal drum axis, and wherein said controller is linked to said valve plate actuator and is adapted to bring said valve in opened position when a row of mould cavities is aligned with said orificed mouth body so that said pressurized foodstuff mass flows into said row of mould cavities and adapted to bring said valve in closed position after filling of said row of mould cavities has been completed.

In an embodiment of the fourth aspect of the invention said controller is also linked to said drive of said mould drum, wherein said controller is adapted to stop or lower the rotation speed when a row of mould cavities of the drum is aligned with said discharge mouth.

In an embodiment of the fourth aspect of the invention said housing of the mass feed member has an introduction mouth in each lateral wall thereof, wherein a valve is associated with each of said introduction mouths, which valve is operable to open and close said introduction mouth, said valve comprising a valve actuator. Possibly, a first piston pump is mounted onto a first lateral wall of said housing and a second piston pump) is mounted onto a second lateral wall of said housing, wherein each of said first and second piston pumps has a single pump piston that is reciprocable in a pump chamber, preferably each pump piston having a length in said longitudinal direction that substantially corresponds to said length of said introduction mouth. Possibly, said first and second piston pumps are arranged in a V relative to said mass feed member housing, wherein said first and second piston pumps are each connected to a respective inlet duct, wherein, preferably, said inlet ducts are arranged in an inverted V and adjoin at a common hopper at their upper ends, which hopper is adapted to receive therein a supply of a foodstuff mass, preferably wherein said inlet ducts each have a length in said longitudinal direction that substantially corresponds to said length of said introduction mouth.

In an embodiment of the fourth aspect of the invention the controller comprises a memory wherein a list of selectable foodstuff masses is stored, e.g. representing different ground meat products, wherein the controller is adapted to input a selection of a foodstuff mass from said list of selectable foodstuff masses, and wherein the controller has a memory wherein predetermined combinations are stored of on the one hand at least each selectable foodstuff mass and said target fill pressure and on the other hand said automatically set ejection air pressure. For example the list of selectable foodstuff masses comprises: ground poultry meat, lean ground beef, fatty ground beef, ground meat mixtures, ground pork, fish meat, etc.

In embodiments of the fourth aspect of the invention the duration of the flow of pressurized air into an air duct of the mould drum for the purpose of ejection of products, herein called a burst of air, may in embodiments depend on an air emitter mounted on the frame being in communication with an inlet of the air duct so that as long as said communication exists air will flow into the duct. The design of the air emitter and of the inlet than basically govern the duration of the ejection air flow in conjunction with the RPM of the drum. In another embodiment one can envisage that the duration is governed by an ejection air control valve, e.g. between a compressor or compressed air storage tank on the one hand and the ejection air emitter on the other hand. In another design an air control valve is integrated into the drum to govern the timing and duration of the flow of pressurized air into the duct for air ejection of products.

In an embodiment of the fourth aspect of the invention the controller comprises a memory wherein a list of selectable mould drums is stored, e.g. representing mould drums having differing mould cavities, wherein the controller is adapted to input a selection of a mould drum from said list of selectable mould drums, and wherein the controller has a memory wherein predetermined combinations are stored of on the one hand at least each selectable mould drum and said target fill pressure and on the other hand said automatically set ejection air pressure. This embodiment may e.g. include an automatic recognition of the actual mould drum that is in operation, e.g. using a transponder or other automatically readable identification on the mould drum, but might also require the operator to input which drum is being used. For example the one mould drum is provided with identical mould cavities of a first design and one or more other mould drums of the installation are each provided with identical mould cavities of second, third, etc., designs. In some embodiments a single mould drum may have groups of differently designed mould cavities, e.g. one or more rows of a first design of mould cavities and one or more rows of a second design of mould cavities.

In an embodiment of the fourth aspect of the invention at least one mould drum is provided with at least a first and a second air duct, each extending to a corresponding first and second group of mould cavities of said mould drum respectively, wherein said mould cavities of said first group differ from said second group, and wherein said controller) is adapted, e.g. a computerized controller is programmed, to automatically set a first group ejection air pressure for ejection of food products from said first group and a different second group ejection air pressure for ejection of food products from said second group by said pressurized air source on the basis of the inputted target fill pressure.

In an embodiment of the fourth aspect of the invention the controller comprises a memory wherein a list of selectable foodstuff masses and list of selectable mould drums is stored, and wherein the controller is adapted to input a selection of a foodstuff mass from said list of selectable foodstuff masses and to input a selection of a mould drum from said list of selectable mould drums, and wherein the controller has a memory wherein predetermined combinations are stored of on the one hand at least each selectable foodstuff mass, each selectable mould drum, and said target fill pressure and on the other hand said automatically set ejection air pressure.

In an embodiment of the fourth aspect of the invention the controller comprises a memory wherein a list of selectable mould drums, e.g. representing mould drums having differing mould cavities, and a list of selectable mass feed members or exchangeable mouth members thereof is stored, e.g. representing mouths having differing shapes and/or structures (e.g. a slotted mouth or an orificed mouth). The controller is adapted to input a selection of a mould drum from said list of selectable mould drums, and to input a selection of the mass feed member or exchangeable mouth members from said respective list. The controller has a memory wherein, for each selectable combination of mould drum and mass feed member or exchangeable mouth member, in combination thereof with the target fill pressure to be inputted, the automatically settable ejection air pressure is stored. This allows the operator to simply instruct which mould drum and mass feed member, or exchangeable mouth member thereof, are present, which could possibly be done automatically by suitable automated recognition devices, and to input the target fill pressure, upon which the controller will automatically set the appropriate ejection air pressure.

In an embodiment of the fourth aspect of the invention at least one mould drum is provided with at least a first air duct and a second air duct, each extending to a corresponding first and second group of mould cavities of said mould drum respectively. The mould cavities of said first group differ from said second group, e.g. with respect to one or more of the general shape, the surface area, the depth, the permeability of the mould surface, etc. The controller is adapted, e.g. a computerized controller is programmed, to automatically set a first group ejection air pressure for ejection of food products from said first group and a different second group ejection air pressure for ejection of food products from said second group by said pressurized air source on the basis of the inputted target parameter. For example a drum has alternating, in circumferential direction, rows of two different designs of mould cavities. Instead of providing a single air pressure for ejection of food products from said rows, this embodiment envisages the use of different ejection air pressures which are automatically adjusted in case the operator inputs a new target fill pressure. This may be an adjustment that is different for the one row compared to another row having different mould cavities, so allowing optimal ejection and air use without being too demanding on the operator.

In an embodiment the controller comprises a memory wherein a list of selectable foodstuff masses and list of selectable mould drums is stored, and wherein the controller is adapted to input a selection of a foodstuff mass from said list of selectable foodstuff masses and to input a selection of a mould drum from said list of selectable mould drums. The controller has a memory wherein a predetermined combination is stored of on the one hand at least each selectable foodstuff mass, each selectable mould drum, and said target fill pressure and on the other hand said automatically set ejection air pressure.

It will be appreciated that the memory of the controller may store therein the specified target fill pressure and other items in the form of tables, e.g. allowing the controller to directly read the automated setting of the air ejection pressure(s) from a table. In other designs, or in combination with the use of tables, the controller may make use of one or more algorithms to calculate the automated setting of the air ejection pressure(s), e.g. based on algorithm identifier(s) and/or variable values that are stored in the memory.

In order to allow the operator to have ultimate control of the production an embodiment envisages that the controller comprises an operator ejection air pressure override allowing an operator to override an automatically set ejection air pressure. In an embodiment the installation comprises a logging device storing all ejection air pressure settings in a logfile during production, e.g. in view of review of the settings and adjustment/fine tuning of the automated setting by the controller.

In an embodiment the installation comprises a warning indicator, e.g. an audible and/or visual alarm, in case air pressure, e.g. stored in a tank, becomes insufficient for proper operation of the air ejection.

In an embodiment the actual fill pressure for the foodstuff mass in the chamber of the mass feed member and/or in the mould cavity is measured by a sensor, e.g. in the chamber, in the drum, or in a face of the mass feed member directly adjoining the cavity during filling.

In an embodiment of the fourth aspect of the invention the controller comprises an operator ejection air pressure override allowing an operator to override an automatically set ejection air pressure.

In an embodiment of the fourth aspect of the invention said automatically set ejection air pressure lies within 0.8 and 2 times the target fill pressure. So for a target fill pressure of 5 bars the controller may set an air ejection pressure between 4 and 10 bars.

In an embodiment the installation is adapted to allow the inputting of a target fill pressure that lies between 6 and 15 bar, and to cause such fill pressure, so at a very high level, e.g. for ground meat, e.g. red meat or beef. It is then preferred for the pressurized air source to be embodied such that it is operable to feed pressurized air at a controllable ejection air pressure that is between 4 and 18 bar, so in a wide range.

In an embodiment of the fourth aspect of the invention said selectable target fill pressure lies between 6 and 15 bar, and wherein said pressurized air source is adapted and operable to feed pressurized air at a controllable ejection air pressure at least in the range extending from 4 to 18 bar.

In an embodiment of the fourth aspect of the invention the pressurized air source comprises an air compressor and at least one pressurized air storage tank having an inlet connected to said air compressor by means of an air pressure regulator, and an outlet provided with an air release valve adapted to cause release of a burst of air from said air storage tank into an air duct in the mould drum associated with cavities at said food product release position.

In an embodiment the pressurized air source for air ejection comprises an air compressor and an pressurized air storage tank having an inlet connected to said compressor and an outlet provided with an air release valve adapted to cause pulsed release of air from said tank into a duct in the mould drum associated with cavities at said food product release position. The air release valve preferably is a quick response open and close valve, e.g. a direct acting solenoid valve, so lacking a pressure regulating feature which means that the air is stored in the air storage tank at the desired air ejection pressure. In another embodiment the air release valve is embodied as a further air pressure control valve or associated with such a valve so that the air may be stored in the air storage tank at a higher pressure than the desired air ejection pressure. For example the air storage tank is adapted to store therein air at a pressure of at least 25 bars.

It will be appreciated that in embodiments of the fourth aspect of the invention the pressurized air food product ejection system further comprises a control of the duration of the air flow into the duct on the basis of the mentioned controller, e.g. said controller being linked to an ejection air control valve that governs the ejection air flow with regard to its duration. For example said duration is controlled to be, at least in some operations, shorter than the time of communication between an ejection air emitter and the inlet of a duct of the drum. Control of the duration of the air flow for air ejection is primarily envisaged to avoid undue consumption of pressurized air for this purpose, so as to avoid that air is kept being dispensed whilst the moulded product has already been effectively released from the mould cavity.

It will be appreciated that the invention also comprises embodiments wherein the controller is adapted, e.g. a computerized controller is programmed, to automatically set the ejection air pressure by said pressurized air source as well as the duration of the air flow into the duct from the pressurized air source on the basis of the inputted target parameter. This can e.g. be done by storing the appropriate information in a memory accessed by a computerized controller. Also in an embodiment provisions can be made for an operator to override the automatically set duration, e.g. to temporarily have a longer duration of the ejection air flow.

In an embodiment the mould drum is provided with multiple groups of mould cavities, including a first group and a second group of multiple cavities each, wherein said mould drum is further provided with at least a first air duct and a second air duct, said first and second air ducts extending to the corresponding first and second group of mould cavities of said mould drum respectively, and said mould cavities of said first group differ from said mould cavities of said second group, and said pressurized air source is adapted to provide air at first group ejection air pressure to said first air duct for ejection of food products from said first group of mould cavities and to provide air to said second air duct at a different second group ejection air pressure for ejection of food products from said second group of mould cavities.

The above mentioned approach of the fourth aspect of the invention allows, in embodiments, to optimize the air ejection for each group of mould cavities. This allows for enhanced product quality, reduced use of pressurized air, and/or greater degree of freedom when it comes to combining different mould cavities on a single drum.

In an embodiment the mould cavities of said first group are arranged in a first row and the mould cavities of said second group are arranged in a second row, said first and second rows being circumferentially spaced from one another.

In an embodiment the mould cavities of said first group and of said second group are arranged in a common row, e.g. alternating.

In a preferred practical embodiment of the fourth aspect of the invention the mould drum has first and second axial end portions, wherein said first air duct has an inlet at said first axial end portion, wherein pressurized air source comprises a first air emitter arranged adjacent said first axial end portion in order to provide air at first row ejection air pressure to said first air duct for ejection of food products from said first group of mould cavities, and wherein said second air duct has an inlet at said second axial end portion. The pressurized air source comprises a second air emitter arranged adjacent said second axial end portion in order to provide air at said second group ejection air pressure to said second air duct for ejection of food products from said second group of mould cavities. By using two air emitters at opposite axial ends of the drum a practical design of the drum and these air emitters is feasible. One could envisage that all the air ducts extend all the way through the length of the drum, e.g. with inlets at both axial ends. In operation then only one air emitter is used to feed in a burst of air, whereas the other air emitter effectively closes the other end of the air duct.

In an embodiment of the fourth aspect of the invention the controller is also adapted, e.g. a computerized controller is programmed, to automatically increase the air ejection pressure that has been set at first instance, e.g. automatically as described herein or manually, over time during production in order to compensate for any impact of soiling of the cavity surface by the foodstuff mass. This measure aims to safeguard proper ejection of products even in case foodstuff masses and/or fill pressures are employed that cause soiling over time, which soiling may impair the effective ejection of the food products. The desired increase may be developed empirically.

For example the controller increases the air ejection pressure based on time expired since starting production with a clean mould drum, or on the basis of the number of filling events per cavity since the clean start. This measure is considered advantageous in particular when using porous material to form the mould cavities. The controller may also take into account the actual foodstuff mass that is being handled by the installation, e.g. adapting the mentioned increase to the actual foodstuff mass.

In an embodiment of the fourth aspect of the invention the installation further comprises a mould cavity air purging assembly that is operable and controllable independent from said pressurized air food product ejection system and is adapted to feed a burst of pressurized air from a pressurized air source to said one or more of said air ducts associated with said one or more mould cavities when in a mould cavity air purge position thereof that is located intermediate the product release position and the fill position of said associated one or more mould cavities so as to cause loosening and/or removal of residue of foodstuff mass by said burst of pressurized air after ejection of the moulded food product has taken place and prior to filling the mould cavity for forming a product in said mould cavity.

It is understood that some foodstuff masses, e.g. fatty ground beef, exhibit the tendency to slowly, yet progressively, built-up on the surface of the mould cavity, e.g. as a thin layer or spots of fatty material. The depositing of residue of foodstuff mass arises in particular when at least part of the mould cavity is made of porous material, e.g. porous sintered metal, which is a material known in the art of these installations and drums thereof. The residue deposit may be on the surface of the mould cavity, but may also be in the porous material itself. By bursting air into the air duct or ducts leading to the empty mould cavity or row of cavities, the residue is subjected to a mechanical force that causes the residue to loosen or become totally dislodged and removed. This process is preferably done whilst the installation is in operation for production of food products and does not interfere with said production.

In a practical embodiment of the fourth aspect of the invention the mould drum has first and second axial end portions, and the air ducts each have an inlet at one or both of said first and second axial end portions, wherein the pressurized air food product ejection system comprises a product ejection air emitter at said product release position and connected via an ejection air control valve to a pressurized air source in order to provide air to a duct associated with the one or more products to be ejected at said product release position. Distinct from and downstream of said product ejection air emitter, the installation is provided with a purging air emitter that is connected via a purging air control valve to a pressurized air source, possibly the same pressurized air source as used in the pressurized air food product ejection system. This purging air emitter provides air to a duct when the associated one or more mould cavities are at said mould cavity air purge position.

For example the purging air bursts are performed with air at another pressure than the air fed into the duct for the purpose of ejection of the moulded food product. For example the purging air burst are performed with air at a higher pressure than for ejection, e.g. over a shorter period at a higher pressure.

Preferably a residue collector is located at said mould cavity air purge position in order to collected dislodged foodstuff mass residue. For example the residue collector includes a vacuum system that sucks up any residue and conveys the residue into a collector container.

Preferably said mould cavity air purging assembly is adapted to cause said purging bursts of air at a selectable frequency, e.g. one burst per cavity or row of cavities connected to a duct per multiple revolutions of the drum, e.g. said frequency being settable by an operator of the installation and/or based on an automated routine run on a programmed controller. This allows for effective purging whilst avoiding undue consumption of pressurized air for this purpose.

For example the mould cavity air purging assembly is controlled by a computerized controller which is programmed to control the bursts of air for purging on the basis of at least one of: foodstuff mass handled by the installation, time or number of filling events expired since first use of cleaned mould drum, target fill pressure, or any combinations thereof. The control may involve setting the pressure and/or duration of the burst.

The invention also relates to a method for moulding food products from a pumpable foodstuff mass, wherein use is made of the installation and air purging is performed as described. For example the method involves setting the frequency of the purging bursts, e.g. via the operator and/or by an automated routine performed by a suitably programmed controller.

In an embodiment the pressurized air source is adapted to regulate the pressure of ejection air so as to provide air to each air duct at a variable pressure level during a single air ejection event, for instance first at a lower air pressure and then at a higher air pressure.

For example the pressurized air source comprises a first air storage tank storing air at a relatively high pressure and a second storage tank storing air at a relatively low pressure, an ejection air emitter being connected to both said first and second storage tank via a valve assembly, and said valve assembly being adapted and operated to release—during a single ejection event—air from said first air storage tank during one part of the duration of the ejection event and air from the second storage tank during the other part of the duration of the ejection event. In an embodiment first the second storage tank is opened so that air at relatively, compared to the higher pressure in the first storage tank, low second pressure is fed into the duct, causing an initial release of the moulded product from the cavity, and then a burst of higher pressure air from the first storage tank is used to cause the released product to be effectively emitted from the cavity. In embodiments one can also envisage the initial application of the first air pressure and then the second air pressure. For example in an embodiment wherein the air ducts of the drum have inlets or openings at both axial ends of the drum one can envisage the provision of two air emitters at the opposed axial ends, the one air emitter being connected via a valve to the first storage tank and the second ejection air emitter being connected via a valve to the second storage tank.

The use of variable pressure level, e.g. two distinct pressure levels, of the ejection air during a single air ejection event may serve to optimize the release and ejection of moulded food products as well as serve to optimize the use of pressurized air for this purpose. It will be appreciated that, if desired, more complex arrangements are possible to obtain a variation of air pressure over the duration of a single air ejection event, e.g. using rapidly responding air pressure control valve.

The fourth aspect of the invention also relates to a method for moulding of three dimensional products from a mass of pumpable foodstuff material, for example from ground meat, wherein use is made of an installation according to the fourth aspect of the invention.

In an embodiment of the method of the fourth aspect of the invention the mass feed member is provided with at least one discharge control valve that is adapted to close the discharge mouth, e.g. the opening of the valve is employed to control the timing of the flow of mass into a mould cavity, e.g. the valve being combined with an orificed mouth body.

In an embodiment of the method of the fourth aspect of the invention the foodstuff mass is ground beef, wherein use is made of a discharge mouth formed by an orificed mouth body, wherein the orifices in the orificed grinder body of the mass feed member have a diameter between 2 and 12 millimetres, e.g. between 4 and 7 millimeters, e.g. about 6 millimeters.

In an embodiment of the method of the fourth aspect of the invention the controller automatically sets, e.g. a computerized controller) is programmed to automatically set, an ejection air pressure by said pressurized air source on the basis of the inputted target fill pressure.

In an embodiment use is made of mould drum that is provided with multiple groups of mould cavities, including a first group and a second group of multiple cavities each, wherein said mould drum is further provided with at least a first air duct and a second air duct, said first and second air ducts extending to the corresponding first and second group of mould cavities of said mould drum respectively, and wherein said mould cavities of said first group differ from said mould cavities of said second group, and wherein said pressurized air source provides air at first group ejection air pressure to said first air duct for ejection of food products from said first group of mould cavities and provides air to said second air duct at a different second group ejection air pressure for ejection of food products from said second group of mould cavities.

It will be appreciated that the installation, e.g. the mould member, the mass feed member, the plunger, the discharge mouth, etc. of the installation of the second, third, or fourth aspect of the invention may include one or more features as discussed with reference to any of the other aspects of the invention.

The invention also relates to a method for moulding food products from a pumpable foodstuff mass, wherein use is made of the installation and air ejection and/or air purging is performed as described.

The invention also relates to a method for moulding of three dimensional products from a mass of pumpable foodstuff material, for example from ground meat, wherein use is made of an installation as described herein.

The present invention also relates to an installation having a computer control for the drum rotation, operation of the feed pump, operation of the pressurizing assembly, and of the air ejection system, said control e.g. being programmed to perform the inventive methods, e.g. with a memory containing predetermined routines that make the installation perform the inventive methods for selected foodstuff masses and products to be formed.

Figure 2:
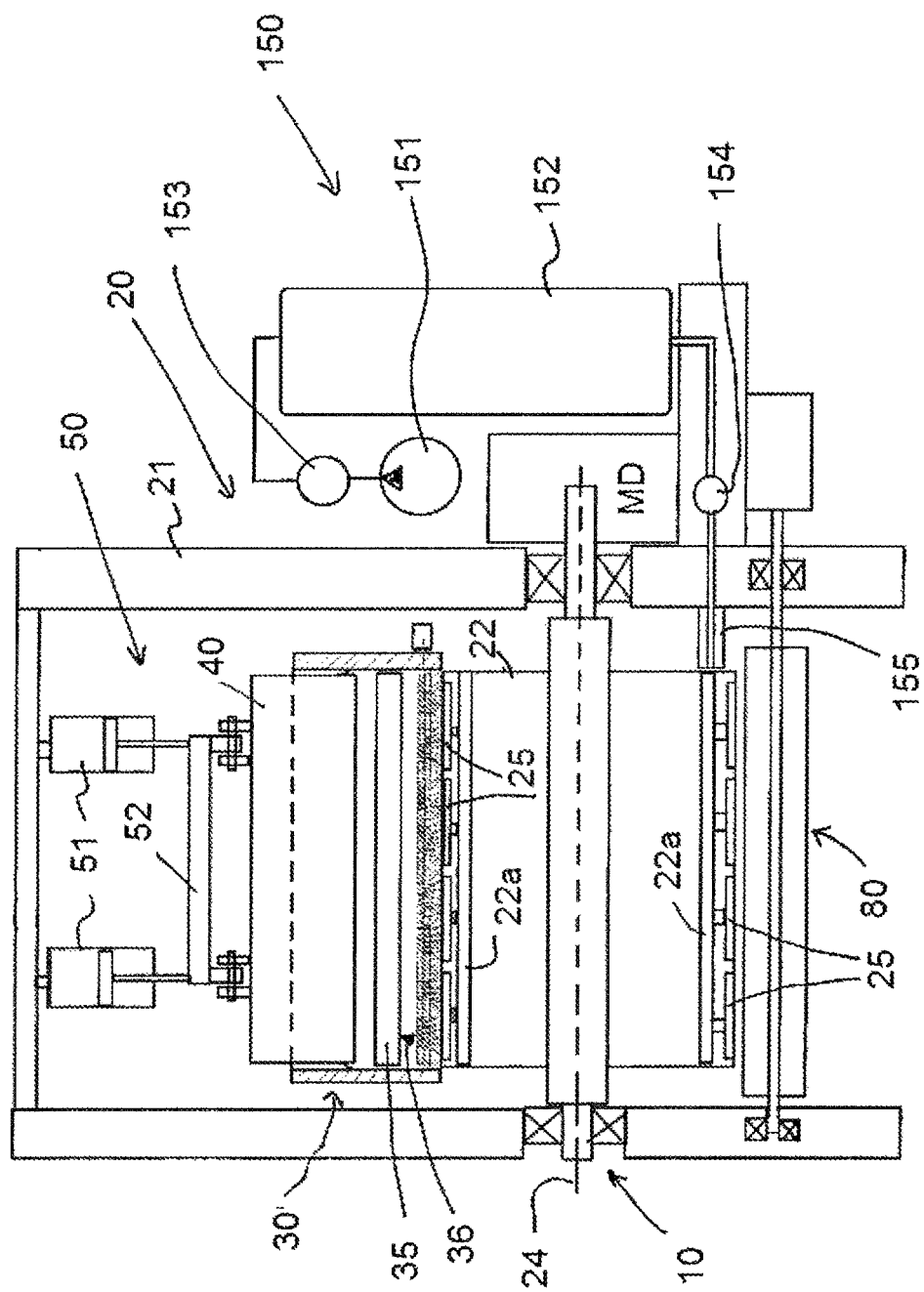
Figure 3:
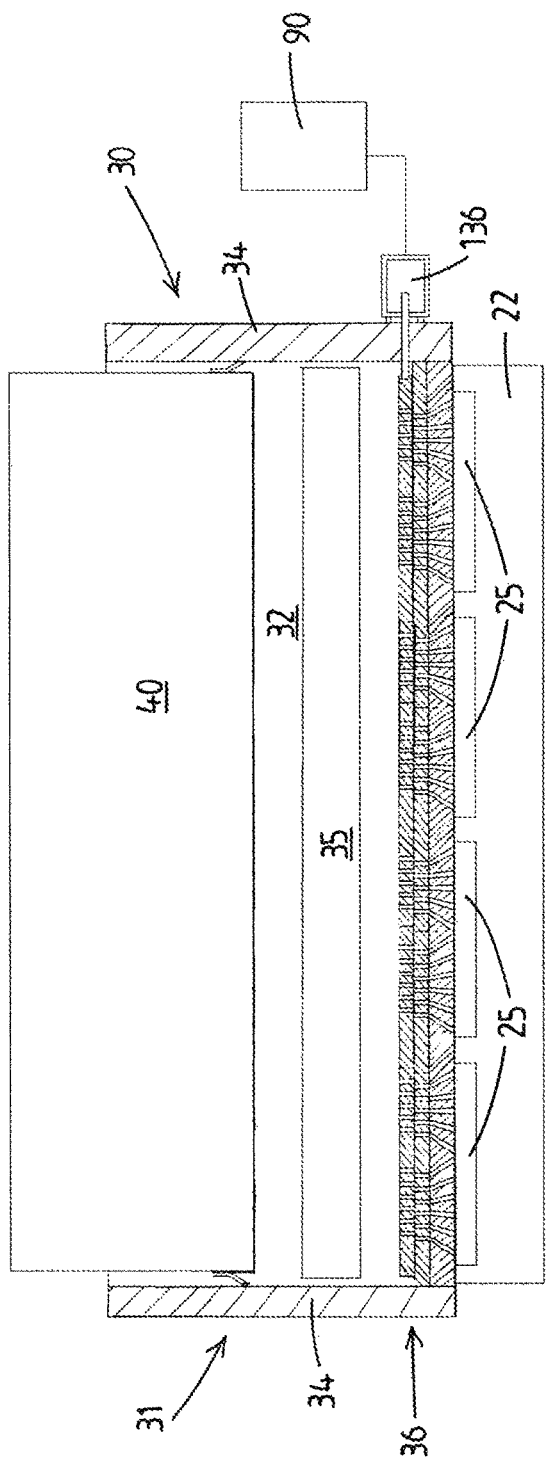
Figure 5:
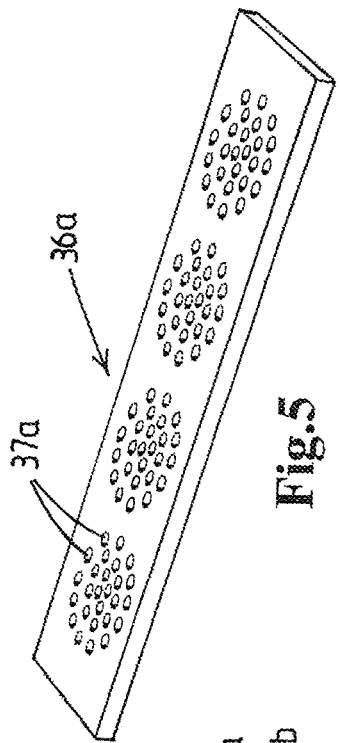
Figure 4:
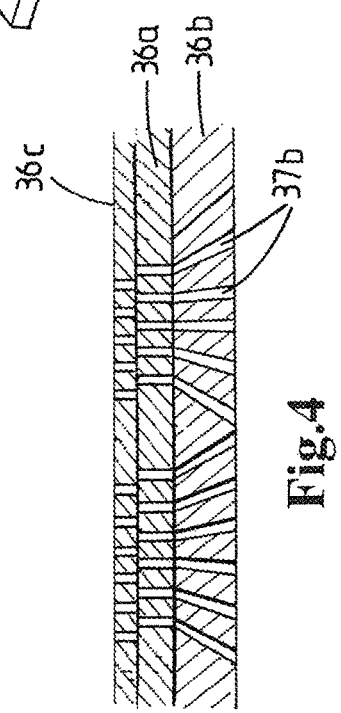
Figure 9:
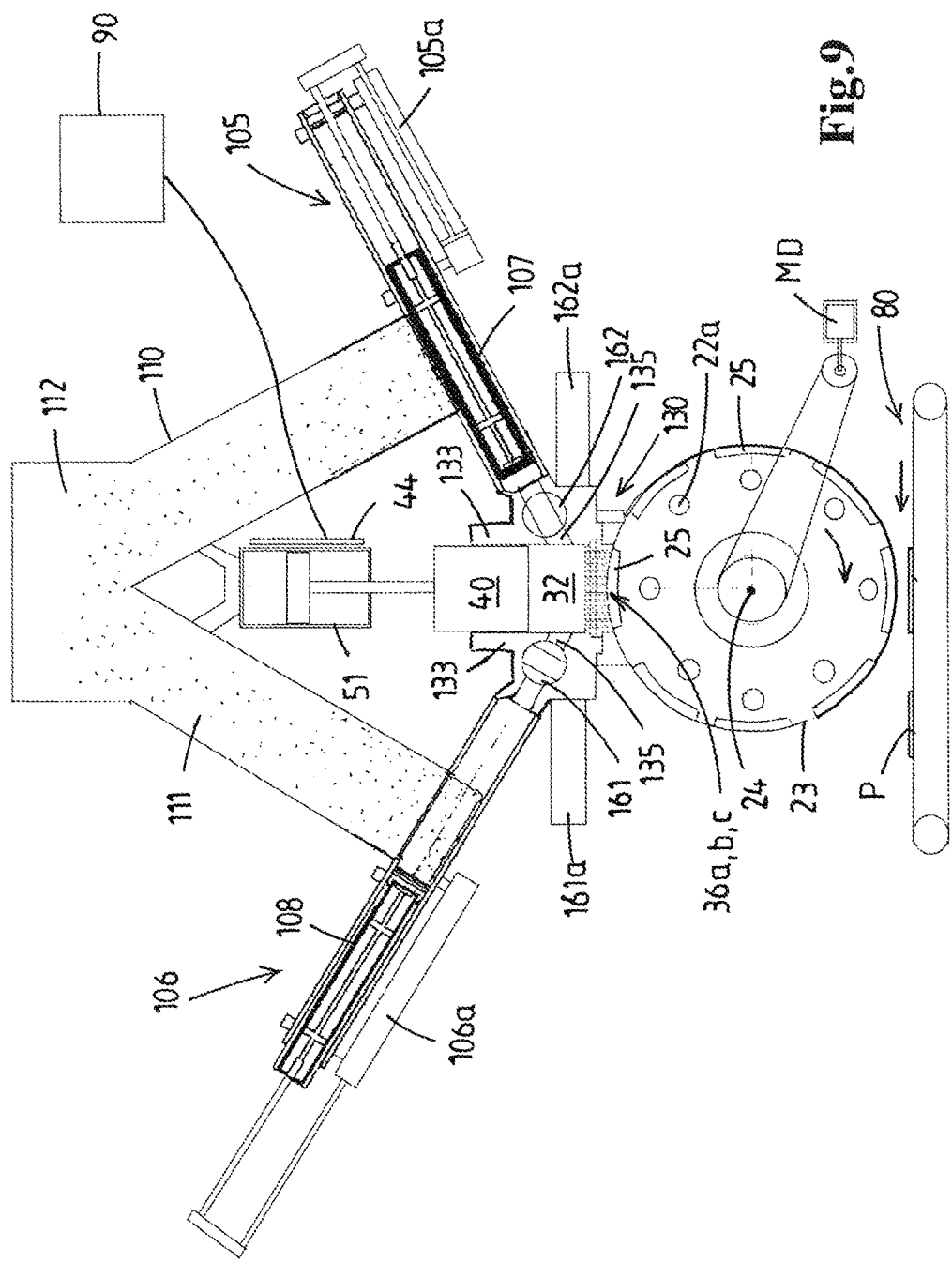
Figure 10:
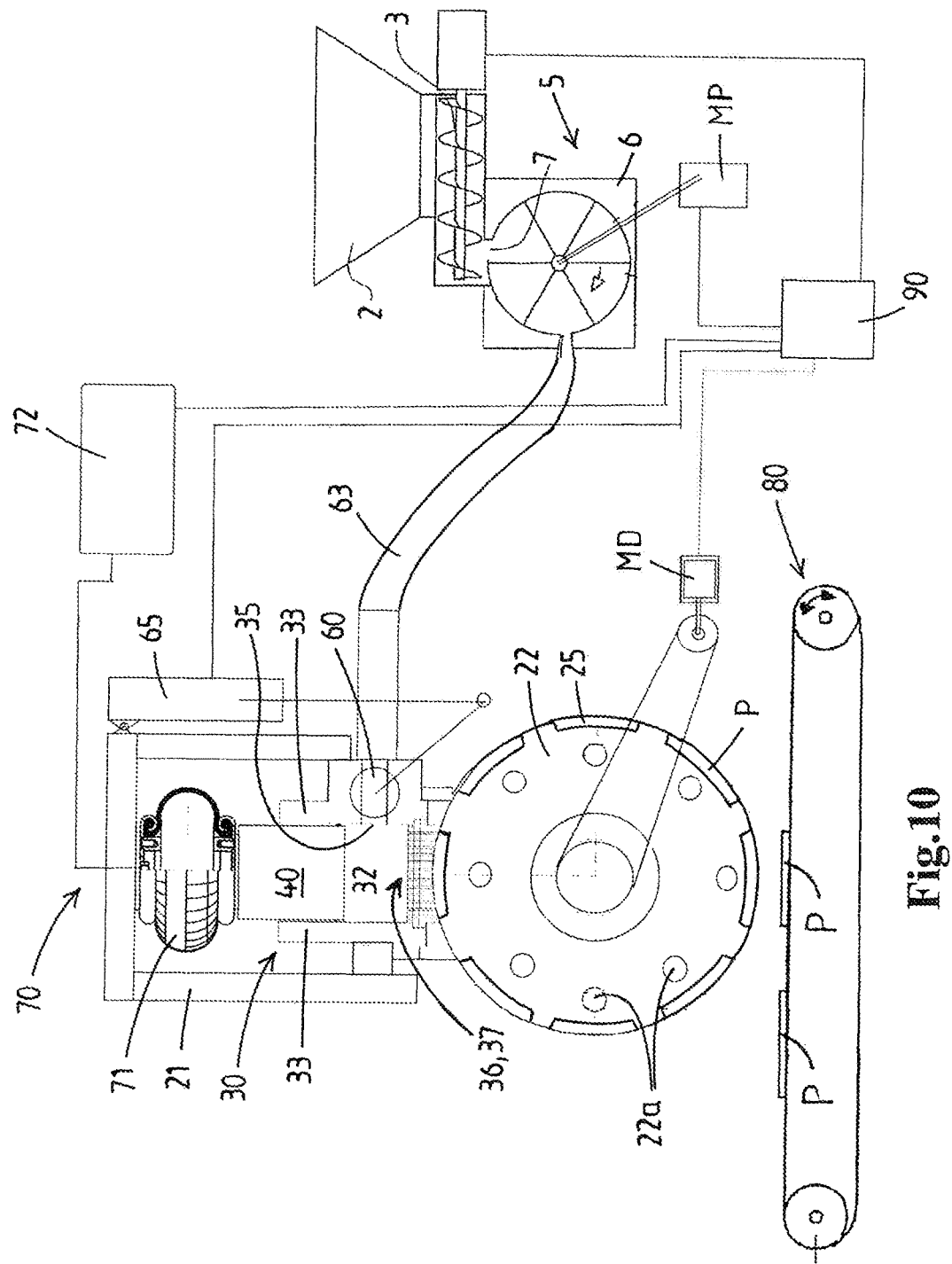
Figure 11A:
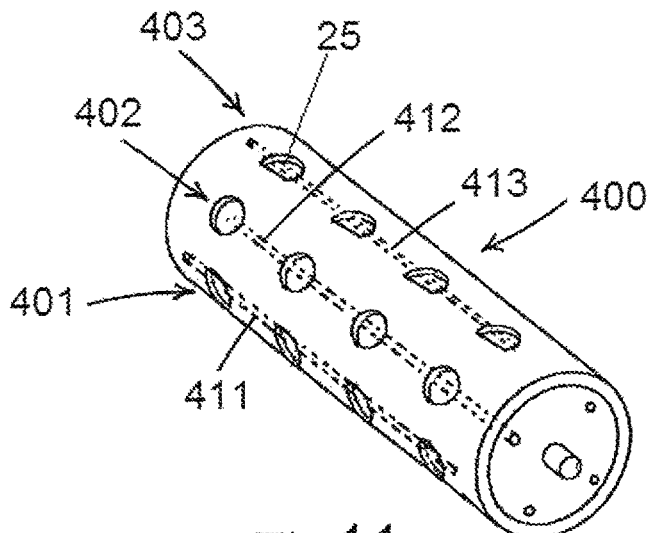
Figure 14A:
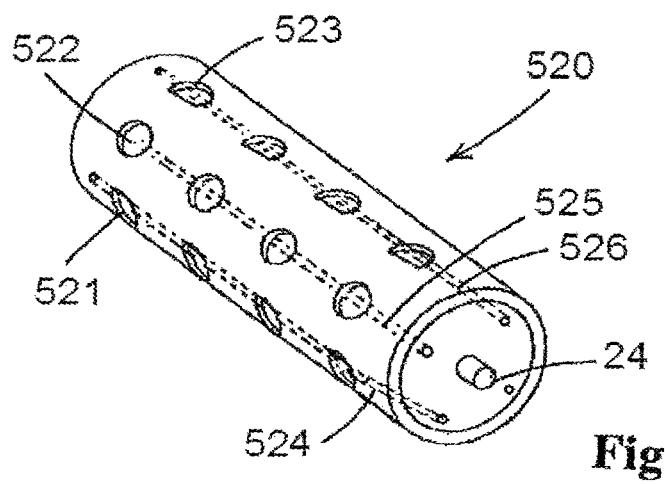

The aspects and optional details of the invention will be explained below with reference to the drawings. In the drawings:

FIG. 1 shows schematically a moulding installation according to the invention for moulding food products from a pumpable foodstuff mass;

FIG. 2 illustrates schematically a front view of the moulding device of the installation of FIG. 1, FIG. 3 shows schematically a longitudinal section of the mass feed member of the moulding installation of FIG. 1, as well as a row of mould cavities of the mould drum, FIG. 4 shows on a greater scale a detail of FIG. 3, FIG. 5 shows in perspective view the metal orificed mouth body part of the mass feed member of FIG. 3, FIG. 6 shows an end portion of the mass feed member of FIG. 3 in longitudinal section, FIG. 7 shows the mass feed member of FIG. 3 in transverse section as well as a portion of the mould drum, FIG. 8 illustrates schematically a top view on the mass feed member, funnel, and pressurizing assembly of the installation of FIG. 1, FIG. 9 illustrate schematically another embodiment of a moulding installation according to the invention for moulding food products from a pumpable foodstuff mass, FIG. 10 illustrates schematically an embodiment of an installation for moulding food products according to the second aspect of the invention, FIG. 11a,b illustrate an embodiment of a mould drum and pressurized air ejection system according to the invention, FIG. 12 illustrates the moulding of food products, pressurized air ejection of the moulded food products, and air purging of mould cavities according to the invention, FIG. 13 illustrates the moulding of food products and pressurized air ejection of the moulded food products according to the invention, FIG. 14a,b illustrate another embodiment of a mould drum and pressurized air ejection system according to the invention.

FIG. 1 schematically depicts a high capacity installation for the moulding of three dimensional products from a mass of pumpable foodstuff material, for example from a ground meat mass, e.g. ground red meat for the production of hamburger patties.

A batch of ground meat mass, e.g. of beef, pork, or poultry meat, is commonly prepared in a grinding process (not shown) with a meat grinding device. A batch of ground meat is then e.g. loaded into a (wheeled) bin and—possibly after some storage time in a cold storage—transported to the installation as shown in FIG. 1.

In this example it is illustrated that the installation 1 may comprise a hopper 2 that is adapted to receive one or more batches of the mass of pumpable foodstuff material, e.g. ground meat.

In this example it is illustrated that an optional hopper discharge assembly is associated with the hopper 2 to assist in discharging the mass from the hopper 2. In this example one or more motor driven augers 3 with motor M3 are mounted at the bottom of the hopper 2.

Instead of loading a hopper 2 of the installation with bin loads of foodstuff mass, the loading of the installation may be conducted via a pipe connecting to the installation, e.g. to a hopper thereof.

The installation further comprises a feed pump 5, e.g. positive displacement, here a rotary vane pump. In other embodiments the feed pump may e.g. be a rotary lobe pump, a piston pump, etc. The pump 5 has a pump housing 6 with an inlet 7 receiving the mass from the hopper 2, here via the auger 3. The feed pump housing 6 further has an outlet 8 for outputting the mass.

The pump 5 shown is a vane pump with a rotor having multiples vanes 9 disposed in a pump cavity of a pump housing. Such rotor pumps, e.g. supplied by Risco (Italy), are known for pumping ground meat and other pumpable foodstuff masses.

A pump drive motor (e.g. electric, shown at MP) is provided for driving the pump. The pump 5 forms pump chambers, in the figure shown between neighbouring vanes 9, that each are successively in communication with the pump inlet 7 for the introduction of mass into the pump chamber and with the pump outlet 8 for the discharge of mass from the pump chamber. The effective volume of the pump chamber reduces from the position thereof at the pump inlet to the position thereof at the pump outlet, so that the mass is effectively expelled from the pump chamber when the pump is in operation. An example of such a pump is disclosed in U.S. Pat. No. 4,761,121.

The pump 5 may instead of a vane pump also be embodied as a different type of pump, e.g. as a piston pump having one or more reciprocating pistons.

The installation 1 further comprises a moulding device 20 comprising:
a frame 21,
a mould member 22, here embodied as a mould drum 22,
a mould member drive MD,
a mass feed member 30,
a pressurizing assembly 50
a moulded products conveyor 80.

The drum 22 is embodied to rotate or revolve as the drum 22 is rotatably supported by the frame 21, e.g. the drum 22 being mounted on a shaft that is supported at one or both ends in a bearing 10 that is carried by the frame 21 of the device 20.

The mould drum 22 has an outer circumferential drum surface 23 and a longitudinal drum rotation axis 24. The drum 22 is rotatably supported by the frame 21 to revolve about the drum rotation axis, here—as is preferred—a horizontal axis.

The mould drum 22 has in the drum surface 23 multiple mould cavities 25, each cavity 25 having a filling opening in the plane of the surface 23 for the introduction of foodstuff mass into the mould cavity and for the later removal or release of the product from the cavity 25.

In the depicted example the cavities 25 are embodied as individual recesses in the outer surface 23 of the drum body, having a bottom opposite the filling opening of the cavity 25.

Preferably the device 20 and drum 22 are designed to allow for an easy exchange of one drum for another drum having a different pattern and shape of mould cavities so as to allow for the production of different food products with the installation.

The mould member drive MD is adapted to move the mould member along a path, here a circular path about the axis 24. The path includes a fill position for filling the mass into a mould cavity at mass feed member 30 that is arranged stationary at said fill position and a product release position for releasing a moulded product from the mould cavity, here at or near the lower section of the circular path. In this example the formed products P are delivered onto conveyor 80 that extends below the drum 22.

FIGS. 1 and 2 also illustrate a pressurized air food product ejection system. The mould drum has air ducts 22a that extend, e.g. from one axial end face of the drum, to the cavities 25. In this example each duct 22a extends to a corresponding row of cavities 25, the row being generally parallel to the drum axis 24.

As illustrated, and as known in the field, the drum 22 is embodied such that at least a portion of the surface that delimits a mould cavity 25 is air permeable. For example each cavity 25 is formed by a porous material insert that is mounted in the body of the drum so that air can flow from the respective duct 22a through the porous material, e.g. sintered stainless steel. This air is introduced, more or less as a burst of pressurized air, into the duct 22a at a release position relative to the drum 22, so that ejected/released food products P fall out of the respective cavity 25 and onto a product conveyor 80 that extends underneath the drum 22.

The ejection system comprises a pressurized air source 150, e.g. a compressor 151 with a pressurized air storage tank 152 and a pressure regulating valve 153 and an air control valve 154 at the outlet of the tank 152. This source 150 is operable to feed pressurized air at a regulated ejection air pressure thereof to an air emitter 155 that is arranged near the revolving drum 22. In operation the inlets of the ducts 22a of the drum sequentially pass the air emitter 155 and align therewith; the valve 154 is then briefly opened to emit a burst of air into the duct 22a. This air then flows out of permeable surface and, as is known in the field, facilitates and/or causes ejection of the moulded food product from said one or more mould cavities at the product release position as is depicted in FIG. 1.

Generally, the ejection of a product from a mould cavity 25 may be facilitated/performed by means of the cavity 25 being bounded by porous material wall parts through which pressurized gas, e.g. air, is expelled to release the product from the cavity. The cavity could also be embodied to comprise a piston type bottom as is also known in the art. Here, as known, the drum is provided with air channels 22a, e.g. one for each row of mould cavities 25, into which air is blown at the release position. This burst of air passes through the respective channel 22a and then through the porous material wall parts of the associated row of mould cavities.

In yet another embodiment the drum is embodied as a hollow tubular member with the cavities each being formed as an opening that extends through the wall of the tubular member. At the interior side of the tubular drum member this moulding device comprises a bottom member that is stationary mounted in the frame and opposite from the mass feed member. This bottom member forms a bottom of the cavity opposite the filling opening of the cavity. In such a design, the ejection of a formed product may e.g. be done by a mechanical knock-out member that knocks the formed product out of the cavity.

The mould member drive MD is preferably an electric drive, e.g. including a servo-controlled electric motor, allowing for a variable and controllable drum rotation speed. In use of the installation 1 it is envisaged that the drum 22 is driven in a continuous, non-interrupted manner, so without starting and stopping during a revolution of the drum 22 in order to achieve a high production capacity. It is possible that the drum 22 is driven at a constant speed during normal production (e.g. with an acceleration when starting production). Here after it is assumed that the speed of the drum 22 is periodically varied during a revolution of the drum, yet preferably without stopping and starting.

In general terms the mass feed member 30 is adapted to transfer the foodstuff mass into a mould cavity of the mould member in a corresponding mould cavity filling event that is defined by the moment of first flow of foodstuff mass into the mould cavity 25 and the moment wherein the mould cavity has been fully filled and flow of foodstuff mass therein is terminated.

The mass feed member 30 has a housing 31 defining an elongated chamber 32 with a longitudinal axis. The housing 31 has a pair of spaced apart long lateral walls 33 having a length and generally parallel to this longitudinal axis. Short end walls 34 interconnect the long lateral walls 33 at respective longitudinal ends thereof. Further the housing 31 comprises a bottom wall that faces the mould drum 22 at the fill position.

In the examples shown the bottom wall 36 is provided with a slot over at least the length of the chamber, and in this slot a discharge mouth body is arranged that forms an orificed discharge mouth spanning the path of the rows of multiple mould cavities at distinct perpendicular axis positions of the drum, so that foodstuff mass flows into the mould cavities via said orificed discharge mouth. In another design the discharge mouth is composed as a single elongated slotted opening, e.g. rectilinear.

The mass feed member 30 is provided with a single elongated plunger 40 that is slidably received in the chamber, sliding between the lateral walls 33 and the end walls 34, generally opposite the bottom wall 36, in a range of travel of the plunger 40 relative to the bottom wall 36. As the mass feed member commonly will be located on the top of the drum, possibly at some inclination, one might say that the plunger travels up and down in the chamber.

The installation comprises a plunger pressurizing assembly 50 that is adapted to cause the plunger 40 to be biased towards the bottom wall 36 at a controllable pressure.

Here the pressurizing assembly 50 comprises one or more pneumatic actuators 51. In this embodiment the one or more pneumatic actuators 51 engage on a lever arm structure 52 that is hinged to the frame at a hinge point 53. This lever arm structure is connected to the plunger 40 so as to obtain amplification of a force exerted by the one or more pneumatic actuators 51. A pneumatic pressure source 55 is connected to a controller 90 in view of operating the one or more pneumatic actuators 51 connected to the pressure source 55.

In FIGS. 1-8, only one lateral wall 33 is provided with an introduction mouth 35 formed by one or more introduction openings, here one elongated slotted opening, that span or spans a major portion of the length of said lateral wall, preferably about the length of the chamber 32. This lateral wall 33 as well as the opposed lateral wall 33 and the end walls 34, all have a portion that extends above the introduction mouth 35.

The range of travel of the plunger 40 is above the introduction mouth 35, so that in this range the plunger 40 does not block the introduction mouth 35 and unduly affects the inflow of mass via said introduction opening by means of the feed pump 5.

The installation further comprises a plunger position sensor 44 that is adapted to provide a plunger position signal corresponding to one or more positions of said plunger, e.g. including an upper position and a lower position of the plunger 40.

The installation comprises a controller 90 which is linked to the plunger pressurizing assembly 50, to the plunger position sensor 44, and to the feed pump 5.

The controller 90 is adapted to input a target fill pressure for the foodstuff mass in the chamber 32 of the mass feed member and/or in the mould cavities 25. For example the input is done via a touchscreen with graphic user interface.

The plunger pressurizing assembly 50 is adapted to constantly pressurize the foodstuff mass in the chamber 32 by means of this single elongated plunger 40 on the basis of the inputted target fill pressure.

The controller 90 is adapted or configured, e.g. a computerized controller is programmed, to operate the feed pump 5 on the basis of the plunger position signal such that the plunger 40 remains in said range of travel during operation of the installation, e.g. said feed pump 5 being started when plunger 40 reaches a lower position near or at a lower limit of said range of travel and the feed pump 5 being stopped when said plunger reaches an upper position near or at an upper limit of said range.

For example the computerized controller 90 is programmed, e.g. on the basis of dedicated software loaded and run on the computer, to automatically set an ejection air pressure by the pressurized air source 150 on the basis of the inputted target fill pressure.

For example the controller 90 comprises a memory wherein a list of selectable foodstuff masses is stored, e.g. representing different ground meat products such as lean and compound ground red meat. Herein the controller is adapted to input a selection of a foodstuff mass from this list of selectable foodstuff masses. The controller has a memory wherein a predetermined combination is stored of on the one hand at least each selectable foodstuff mass and the target fill pressure to be inputted and on the other hand said automatically set ejection air pressure. By selecting the food stuff mass, e.g. also by means of the touchscreen, and by inputting the target parameter, the controller will automatically find the associated air ejection pressure in the memory, e.g. in the form of a table, and will steer the air source 150 to create this air ejection pressure. This means that when switching from one foodstuff mass to another, the operator will only have to select the mass and the target fill pressure, and the controller 90 will then reliably set the correct ejection air pressure.

As operators of these installation commonly prepare differently shaped food products using different mould drums 22, they commonly have available at the production location multiple different drums 22. When switching from one shape of product to another, the one drum is removed from the moulding device and another is installed. For this situation it is advantageous when the controller 90 comprises a memory wherein a list of selectable mould drums 22 is stored, e.g. representing mould drums having differing mould cavities 25, The controller is then adapted to input a selection of a mould drum from said list of selectable mould drums, e.g. on the basis of an automated recognition of the mould drum, e.g. using an automated code reader, e.g. using a transponder, but a manual selection of the drum is also possible. Then it is envisaged that the controller has a memory wherein a predetermined combination is stored of on the one hand at least each selectable mould drum and the target fill pressure to be inputted, and on the other hand the automatically settable ejection air pressure. So then the computerized controller will automatically set the ejection air pressure that is effective for the selected mould drum.

It will be appreciated that more complex versions are possible, wherein the controller stores in its memory for each selectable drum a predetermined combination of on the one hand at least each selectable foodstuff mass and the target fill pressure to be inputted and on the other hand said automatically set ejection air pressure. Further complex versions will be apparent to the skilled person.

The automatic selection and setting of the air ejection pressure by the controller 90, preferably computerized controller, may also involve the factor of progressive soiling of the mould drum. One can envisage that over time, during production, small bits of the foodstuff mass may stick to the surface of the mould drum even though the air ejection causes loosening of foodstuff from the surface. This soiling may possibly reduce, e.g. locally, the air permeability of the surface, e.g. in case of a porous material forming a portion of the cavity surface.

In an embodiment the controller is adapted to automatically vary, e.g. on the basis actual operating time starting from a cleaned condition of the mould drum, the ejection pressure in order to compensate for any effect of soiling of the mould drum on the air ejection process. For example the air ejection pressure that is set at first instance, e.g. as described above, is automatically gradually or stepwise increased over time, e.g. until the cleaning of the drum is performed (which may be done whilst the drum is on the mould device, e.g. using hot water from a high pressure sprayer). In an embodiment the installation is adapted to graphically display the automatically variation of the air ejection over time during a production process, e.g. to inform the operator about this automatic variation and the current status.

As is illustrated in FIGS. 1-7, 9, 10 the orificed mouth body is a composite body with parts 36a, 36b— as is preferred—and comprises a metal or ceramic orificed mouth body part 36a that forms the valve side face of the mouth body and a plastic mouth body part 36b that adjoins the orificed body part 36a so that said orifices 37b therein form a continuation of orifices 37a. Effectively the plastic body part 36b forms the outlet face of the mouth body that faces the mobile mould member 22. This is for example advantageous when the mould member, here drum 22, has a metal surface or metal surface parts engaging the outlet face of the body.

The discharge mouth here is thus formed by a multitude of outlet orifices 37b so that each cavity 25 is filled via multiple outlet orifices 37b, e.g. cylindrical bores at various angles to obtain a desired inflow of the mass into a mould cavity 25. Other cross-sectional shapes of the outlet orifices 37b are also possible.

It will be appreciated that the rotation of the drum 22 causes at some point in time that the row of mould cavities 25 is aligned with the outlet face of the mouth body and the discharge mouth thereof. Along the effective outflow opening the ground mass can flow into the mould cavities.

It is noted that in a practical embodiment of a drum moulding device the filling events of rows of cavities 25 that take place at the mass feed member can succeed one another at a very high pace, e.g. each 0.5 seconds or even each 0.25 seconds a new filling event. This means in practice that the intermediate period between filling events can have a duration between, for example, 0.1 and 0.3 seconds.

As can be seen in the example the drum 22 is provided with a pattern of multiple mould cavities 25 with cavities 25 in rows at distinct perpendicular axis positions when seen perpendicular to the path of the mould member, so here at different positions relative to the length of the drum 22. In more detail the drum 22, as is a common embodiment in the art, is provided with arrays of multiple cavities 25 when seen in circumferential direction of the drum 22, with axial spacing between adjacent arrays when seen in axial direction of the drum.

The cavities in adjacent arrays on the drum 22 are aligned in rows that are parallel to the axis 24. It is however also possible to have the cavities 25 in non-parallel arrangement, e.g. in staggered rows when seen in longitudinal direction on the drum or in spiraling lines.

As indicated above it is envisaged, as is known in the art, that the mould member, e.g. the drum 22, is exchangeable for another mould member, having a different pattern and/or shape of mould cavities.

As is preferred the mass feed member 30 may sealingly engage onto the drum surface 23, e.g. around the discharge mouth, to avoid leakage of mass between the drum and the mass feed member 30. For example one or more drum engaging seal members 39 are provided.

As depicted there is no upstream closure member for the cavities 25 in the drum 22, as it is envisaged that the filling event only occurs when the entire cavities 25 are effectively aligned with the orificed outlets. In alternative embodiments, e.g. with a singular slot as discharge mouth and continuous speed drive of the drum, one may envisage the provision of an upstream closure member for the mould cavities, e.g. a flexible plate that is pressed against the drum with an adjustable force in an elastic manner, e.g. using pneumatics.

As depicted here there is no downstream closure member for the cavities in the drum, as it is envisaged that the filling event only occurs when the entire cavities are effectively aligned with the orificed outlets and as relaxation of the mass in the cavities 25 is allowed once the cavities are moved away from the fill position.

Depicted is a flexing resilient flap 38 that is secured at one end to the housing 31 and flexes under the influence of the relaxing mass filled in the cavities 25. This aides the controlled relaxation of the mass.

Provision of a downstream closure member that extends in downstream direction from the mouth of the mass feed member serves to keep the filled cavities closed for a while as the filled cavities move away from the fill position. This allows the mass to become a more coherent food product when desired.

The mass in the mould cavity forms the food product, e.g. the meat patty.

Optional details of a mould drum 22, mass feed member 30, and any closure member, are e.g. disclosed in WO00/30548 and in WO2004/002229.

For example, the one or more closure members may each comprise a semi-circular plate member, preferably of flexible design, that is urged in sealing contact with the surface 23 by one or more actuators, e.g. pneumatic actuators, e.g. with transverse lamellae between the plate member and the one or more actuators. This is known in the art.

The feed pump 5 advances the foodstuff mass through the tube or hose 63 towards the mass feed member 30.

By suitable control of the feed pump 5, e.g. of the pump rotor speed, e.g. using a controllable electric pump drive motor MP, the output of mass by the pump can be controlled.

At the release position that is downstream of the fill position the formed product P, here meat product P, is released from the mould cavity 25, e.g. to be transported onward on a conveyor 80, e.g. to other downstream equipment, e.g. an oven, a fryer, etc.

The installation may comprise a controllable vacuum assembly, e.g. integrated with the pump 5 as is known in the art. This vacuum assembly may be adapted to cause controlled evacuation of air from the mass at one or more locations in the trajectory of the mass from the hopper 2 to and including the pump chamber at a position where it is in communication with the pump inlet of the positive displacement pump. As is preferred, this vacuum assembly comprises a vacuum pump, e.g. an electrically operated vacuum pump.

If desired a vacuum may be created in the hopper 2 as is known in the art. A vacuum may also be created in any passage between the hopper 2 and the pump inlet 6, e.g. in a duct into which one or more augers 3 of a feed assembly extend.

With reference to FIG. 9 we will now, amongst others, elucidate the third aspect of the invention.

It is illustrated in FIG. 9 that the housing 130 of the mass feed member has an introduction mouth 135 in each lateral wall 133 thereof. For each introduction mouth 135 there is a dedicated valve 161, 162.

Preferably each valve 161, 162 arranged to govern flow through an introduction mouth, when at all present, is a rotary tube valve as is schematically indicated in FIG. 9. Such a valve has an elongated substantially cylindrical valve body that is rotatably received in a bore, here in the housing of the mass feed member, and that has an elongated axial slot through the rotary cylindrical body that in an opened angular position is aligned with the inlet and outlet so that mass may pass from the respective pump into the chamber 32 for its replenishment (right-hand side of FIG. 9) and in a closed angular position (left-hand side of FIG. 9) the slot of the rotary tube valve is disconnected from the inlet and outlet so that the valve is effectively closed.

For each valve 161, 162 a corresponding valve actuator 161a, 162a is provided that is linked the controller 90. Thereby, upon signals from the controller 90, each of the valves 161, 162 is operable to open and close the respective introduction mouth.

FIG. 9 also illustrates that a first piston pump 105 is mounted onto the first lateral wall 133 of the housing and a second piston pump 106 is mounted onto the second lateral wall of the housing.

As is preferred each of the first and second piston pumps 105, 106 has a single pump piston 107,108 that is reciprocable in a pump chamber by an actuator, e.g. pneumatic cylinder(s) 105a, 106a. The operation of the pumps 105, 106, including the piston actuators 105a, 106a, is controlled by controller 90.

As is preferred each pump piston 107, 108 has a length in the longitudinal direction, so here at right angles to the plane of the figure, that substantially corresponds to the length of the introduction mouth 135 along the main axis of the chamber 32 so that the mass is pushed over a whole front into and through the introduction mouth 135 and into the chamber 32 underneath the then upward moving plunger 40, thereby avoiding undue shear etc. within the mass, e.g. in the ground meat mass.

In FIG. 9 it is further illustrated that the first and second piston pumps 105, 106 are arranged in a V relative to the mass feed member housing 130. In another arrangement, the piston pumps 105, 106 are located in a common plane, e.g. perpendicular to the motion path of the plunger 40.

The first and second piston pumps 105, 106 are each connected to a respective inlet duct 110,111 and, as preferred, these inlet ducts are arranged in an inverted V and adjoin at their upper ends a common hopper 112. This hopper is adapted to receive therein a supply of a foodstuff mass. At each pump chamber inlet of the pumps 105, 106 a non-depicted sliding valve member may be present.

It is preferred for the mass to flow into the opened and empty pump chamber of the piston pumps 105, 106 purely on the basis of gravity, so without an external force being exerted on the mass that may cause undue pressurization prior to entry into the piston pump 105, 106.

As preferred the inlet ducts 110, 111 of the piston pumps 105, 106 each have a length in said longitudinal direction that substantially corresponds to said length of said introduction mouth.

It will be appreciated that in an operation of the installation of FIG. 9 according to the first aspect of the invention, the controller 90 is adapted, e.g. a computerized controller is programmed, to operate the piston pumps 105, 106 on the basis of the plunger position signal from sensor 44 such that the plunger 40 remains in the mentioned range of travel during operation of the installation. For example one piston pump will be operated to feed mass into the chamber 32 via the respective then opened valve whilst the other piston pump will be disconnected from the chamber 32 via its respective then closed valve allowing said other piston pump to retract the piston fora renewed filling of the pump chamber with foodstuff mass. By repeating this sequence alternating for the left-hand and right-hand piston pump a continuous and high-capacity operation can be achieved whilst the plunger 40 maintains the desired, preferably substantially constant, pressurization of the mass in the chamber 32.

As discussed the timing and control of the filling of a row of mould cavities, for example with the drum 22 being revolved in intermittent mode by the drive MD, can in embodiments be governed by a plate valve 36c controlling the opening and closing of the orificed mouth body 36a,b. It will be appreciated that the actuator of valve 36c is then also connected to controller 90.

The presence of the orificed mouth body 36a,b optimizes the installation for the production of, for example, home-style type meat patties out of ground meat. As discussed instead of the orificed design of the mouth body, one could provide for a singular slot mouth through which a row of mould cavities if filled. One can envisage that the row is a straight row parallel to the axis 24 of the drum, but one can also provide for a spiral or helical row or some staggered arrangements of the cavities in a row.

It is noted that, if desired, yet not preferred the plunger 40 could be replaced by a series of plungers acting on the mass in the chamber 32 to obtain pressurization thereof or some other arrangement that causes such pressurization.

FIG. 9 does not depict the already discussed air ejection system which could be the same as discussed with reference to FIG. 1.

If desired the installation of FIG. 9 can also be embodied according to the second aspect of the invention and operated accordingly.

With reference to FIG. 10 now the second aspect of the invention will be elucidated.

FIG. 10 shows schematically an installation for moulding of three dimensional products P from a mass of pumpable foodstuff material. For example, as preferred, the installation is operated to make home-style type meat patties out of ground meat.

The installation comprises hopper 2, feed pump 5 for the foodstuff mass, and feed pump drive MP. These components may have one or more of the features discussed herein above.

The installation further comprises a moulding device 20 comprising:
- a frame 21,
- a mobile mould member 22 here embodied as a mould drum,
- a mould member drive MD for moving the mould member along a path, here rotation of the drum, possibly stepwise,
- a mass feed member 30 with a plunger 40 arranged at a fill position relative to the path of the mobile mould member,
- a valve 60 associated with the introduction mouth in the mass feed member and a valve actuator 65,
- a plunger pulsing assembly 70 adapted to cause periodic pulsating motions of the plunger 40, a moulded products conveyor 80.

The drum 22 is embodied to rotate or revolve as the drum 22 is rotatably supported by the frame 21, e.g. the drum 22 being mounted on a shaft that is supported at one or both ends in a bearing 10 that is carried by the frame 21 of the device 20.

The mould drum 22 has an outer circumferential drum surface 23 and a longitudinal drum rotation axis 24. The drum 22 is rotatably supported by the frame 21 to revolve about the drum rotation axis, here—as is preferred—a horizontal axis.

The mould drum 22 has in the drum surface 23 multiple mould cavities 25, each cavity 25 having a filling opening in the plane of the surface 23 for the introduction of foodstuff mass into the mould cavity and for the later removal or release of the product from the cavity 25.

In the depicted example the cavities 25 are embodied as individual recesses in the outer surface 23 of the drum body, having a bottom opposite the filling opening of the cavity 25.

The multiple mould cavities 25 are arranged in rows of multiple cavities each, wherein the cavities in a row are located at distinct positions in a perpendicular axis direction, so perpendicular to the plane of FIG. 10 and generally parallel to the axis 24. In embodiments the cavities of a row are perfectly aligned parallel to the axis 24, in another embodiment the cavities may be staggered within a row.

The ejection of products P from a row of mould cavities may be facilitated/performed by means of the cavities being bounded by porous material wall parts through which pressurized gas, e.g. air, is expelled to release the product P from the respective cavity. Here, as known, the drum is provided with air channels 22a, one for each row of mould cavities 25, into which air is blown at the release position above the conveyor 80. This burst of air passes through the respective channel 22a and then through the porous material wall parts of the associated row of mould cavities 25. The system could be the same as discussed with reference to FIG. 1.

The mould member drive MD is preferably an electric drive, e.g. including a servo-controlled electric motor, allowing for a variable and controllable drum rotation speed. In use of the installation depicted in FIG. 10 it is envisaged that the drum 22 is driven in a non-continuous, more or less interrupted manner, so with periodic starting and stopping, or at least periodic slowing down and accelerating, during a revolution of the drum 22 in synchronization with a row becoming aligned with the discharge mouth of the mass feed member 30. So it is envisaged that the drive MD causes the row of mould cavities to be at a complete standstill or at a low rotational speed during the filling process of the respective row. In order to optimize production speed the drum is then accelerated to move a further row of cavities into alignment with the discharge mouth. Current servo-controlled electric motors allow for such periodic motion of the mould drum 22.

In general terms the mass feed member 30 is adapted to transfer the foodstuff mass into a row of mould cavities of the mould member 22 in a corresponding mould cavities filling event that is defined by the moment of first flow of foodstuff mass into the row of mould cavities 25 and the moment wherein the mould cavities have been fully filled and flow of foodstuff mass therein is terminated.

The mass feed member 30 has a housing 31 defining an elongated chamber 32 with a longitudinal axis that is perpendicular to the circular path of the drum and parallel to the axis 24 of the drum 22.

The housing 31 has a pair of spaced apart long lateral walls 33 having a length and generally parallel to this longitudinal axis. Short end walls 34 interconnect the long lateral walls 33 at respective longitudinal ends thereof. Further the housing 31 comprises a bottom wall 36 that faces the mould drum 22 at the fill position.

In the example shown in FIG. 10, as preferred in the context of the second aspect of the invention, the bottom wall 36 is provided with a slot over at least the length of the chamber, and in this slot a discharge mouth body is arranged that forms an orificed discharge mouth spanning the path of the rows of multiple mould cavities 25, so that foodstuff mass flows into the mould cavities of a row via said orificed discharge mouth.

The mass feed member 30 is provided with a single elongated plunger 40 that is slidably received in the chamber, sliding between the lateral walls 33 and the end walls 34, generally opposite the bottom wall 36, in a range of travel of the plunger 40 relative to the bottom wall 36. As the mass feed member commonly will be located on the top of the horizontal axis type drum 22, possibly at some inclination relative to vertical, one might say that the plunger travels up and down in the chamber.

It is illustrated in FIG. 10 that one lateral wall 33 is provided with an introduction mouth 35 formed by one or more introduction openings, here one elongated slotted opening, that span or spans a major portion of the length of said lateral wall, preferably about the length of the chamber 32. This lateral wall 33 as well as the opposed lateral wall 33 and the end walls 34, all have a portion that extends above the introduction mouth 35.

The valve 60 is provided to open and close this mouth 35 on demand by means of valve actuator 65.

The installation further comprises the plunger pulsing assembly 70 that is adapted to cause periodic pulsating motions of the plunger 40 in a range of travel of the plunger 40 towards the bottom wall in synchronicity with the successive alignments of successive rows of mould cavities 25 with the discharge mouth as governed by the drive MD.

The installation further comprises a controller 90 which is linked to the plunger pulsing assembly 70, to the valve actuator 65, and to the feed pump 5.

The controller 90 is adapted, e.g. a computerized controller is programmed, to operate the valve 60 of the introduction mouth 35 so that the valve 60 opens and closes in synchronicity with the successive alignments of rows of mould cavities with the discharge mouth and with successive pulse motions of the plunger 40, such that the valve 60 is closed when a row of mould cavities is aligned with the discharge mouth.

The controller 90 is adapted to operate the plunger pulsing assembly 70 such that, with the valve 60 being closed, the single elongated plunger 40 performs a pulse motion towards the bottom wall of the mass feed member housing, thereby causing a pressure pulse in the foodstuff mass within the chamber 32 and the pressurized transfer of foodstuff mass into the row of mould cavities that is aligned with the discharge mouth.

The controller 90 is adapted to open the valve 60 between successive pulse motions of the plunger 40 and to operate the feed pump 5 such that the feed pump, here via hose or tube 63, then replenishes the chamber 32 with foodstuff mass.

As preferred the plunger pulsing assembly 70 comprises one or more pneumatic actuators, most preferably pneumatic bellow actuators 71, most preferably directly on top of the elongated plunger 40 as illustrated in FIG. 10.

The assembly 70 also comprises a source of pressurized air 72, e.g. including a compressor, compressed air storage tank wherein a supply of pressurized air is stored, and a valve linked to the controller 90 and steered to release successive bursts of pressurized air to the one or more actuators 71.

As illustrated here, it is envisaged (e.g. for production of home-style meat patties) to have an orificed discharge mouth via which a row of cavities is filled in one go. Possibly a plate valve as discussed above is associated with the orificed discharge mouth, the plate valve opening and closing the orifices on demand.

For example when making home-style patty products out of rather cold, e.g. close to freezing temperature, ground meat, a practical embodiment using an orificed discharge mouth may entail that the plunger pulsing assembly 70 creates pressure pulses in the ground meat mass within the chamber 32 that reach in the pressure range between 10 and 20 bars. For example the pressure peak lies between 12 and 16 bars. The closed valve 60 prevents this pressure pulse from having a negative influence on the mass that is present upstream of the valve, e.g. causing it to loose moisture due to being overpressured for too long a time. At the same time closing the valve 60 avoids that the upstream mass dampens the creating of the desired pressure pulse. Upstream the mass could e.g. be held at pressures around 5 bars, with said pressure being sufficient to replenish the chamber 32 between successive pressure pulses. The relative low pressure of the mass upstream of the valve 60 compared to the relatively high peak pressure of the pulsing is thus favourable for the mass quality and thus for the final product P that is formed. It will be appreciated that near freezing the moisture containing meat mass will be rather susceptible to small changes of temperature and exhibit quite more resistance to flow through the orificed discharge mouth when being somewhat colder. This can be compensated for by appropriate setting of the pulsing assembly.

When used in conjunction with a plate valve to control the opening and closing of the orificed mouth, it may be practical to start the pulsing assembly ahead of the plate valve actually opening the orifices. This causes that the plate valve governs the actual moment of inflow of mass into the row of mould cavities. Similarly it can be practical to continue the pressure pulse timewise beyond the actual closing of the orifices by the plate valve, so that the pressure on the mass is maintained throughout the entire filling event. Thereafter, with the plate valve closed, the pressure pulse is terminated and the valve 60 is opened to replenish the chamber 32.

One can also envisage an embodiment of the second aspect of the invention wherein the composition of the foodstuff mass that is pumped by the feed pump 5 into the mass feed member chamber 32 is such in relation to the orifices in the orificed mouth body that the foodstuff mass in said composition is unable to pass through the orifices in the orificed mouth body under influence of the foodstuff mass pressure caused by the feed pump. In order to expel the mass through the orifices into the row of mould cavities on then operates the pulsing assembly 70 to causes a pulse with increased pressure such that said foodstuff mass passes through the orifices in the orificed mouth body. This may e.g. allow to dispense with a plate valve as discussed herein.

It will be appreciated that the installations described herein may comprise one or more pressure sensors at appropriate locations, e.g. to determine actual mass pressure at one or more locations in the installation. For example one or more pressure sensors are provided to sense actual mass pressure within the chamber, between the pump and the mass feed member, and/or within the mould cavities.

It will be appreciated that the size of the chamber 32 can be the same for an installation according to the first or second aspect of the invention.

FIG. 11a,b illustrate a mould drum 400 having multiple rows, e.g. 401, 402, 403, of multiple mould cavities 25 each. These rows are spaced apart in circumferential direction of the outer surface of the drum 400. Each row, here of four cavities, forms a group of multiple cavities.

The mould drum 400 is further provided with air ducts 411,412,413, that respectively are connected or in communication with a dedicated row, 401, 402, 403 of mould cavities respectively.

As can be seen the mould cavities of the rows 401, 403 are all the same, whereas the cavities of row 402 are different in design to make another shaped food product.

In FIG. 11a it is depicted that ducts 411, 413 have an inlet at one (not visible) end of the mould drum 400, e.g. as is known in a front axial face of the drum, whereas the duct 412 has an inlet at the opposed axial end of the drum 400, here also in the front axial face.

Figure 11B:
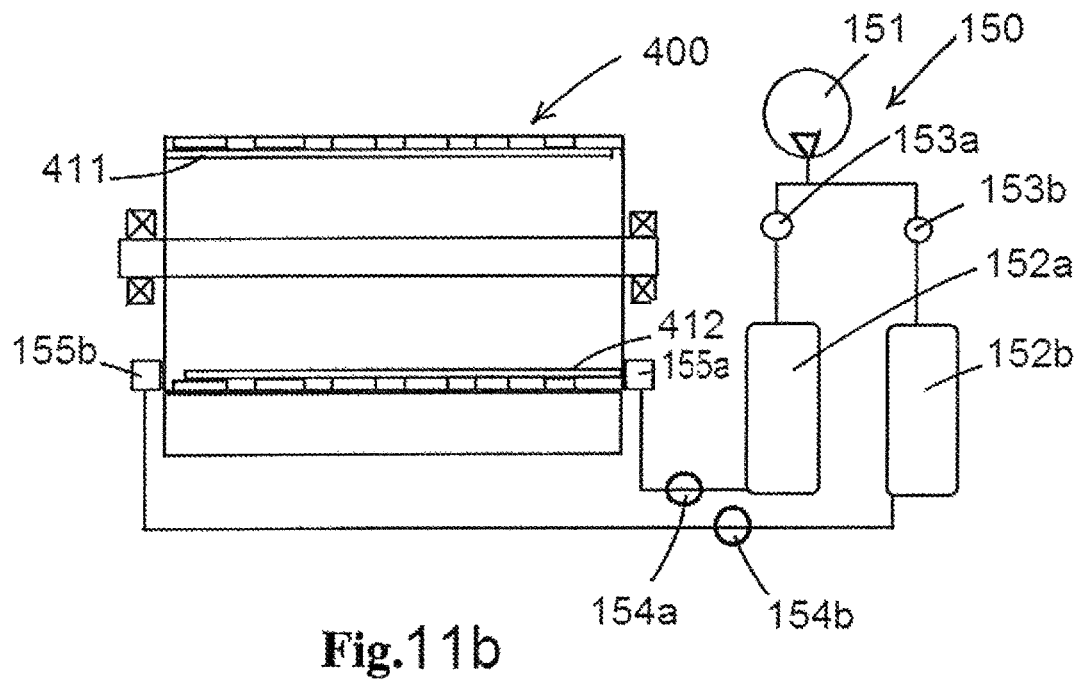

FIG. 11b illustrates the drum 400 and the pressurized air ejection system to is used in combination with the drum 100. This system comprises the ducts 411,412,413 in the drum 400 as well as a pressurized air source with a compressor 151, two storage tanks 152a,b for compressed air, two pressure regulator valves 153a,b (each to regulate the pressure in a respective tank, allowing to set different pressure levels in the storage tanks), and at the outlet of each tank an air control valve 154a,b.

Also a first air emitter 155a is arranged adjacent said first axial end portion of the revolving mould drum in order to provide air at first row ejection air pressure to the air ducts 412, for ejection of food products from said rows of mould cavities, and a second air emitter 155b is arranged adjacent the opposed axial end portion in order to provide air at said second row ejection air pressure to said second air duct 411, 413 for ejection of food products from said second row of mould cavities.

The depicted approach allows for optimizing the air ejection from each row taking into account the presence of at least two rows with mould cavities that differ from the one row to the next.

For example the controller 90 is adapted, e.g. a computerized controller is programmed, to automatically set a first group ejection air pressure for ejection of food products from said first group and a different second group ejection air pressure for ejection of food products from said second group by the pressurized air source on the basis of the inputted target parameter. The controller 90 then controls the valves 154a,b so that the respective tank is connected to the desired air duct and so to have the appropriate air ejection for ejecting products from the row of mould cavities.

The same approach may also be done for a mould drum wherein the different mould cavities are not organized row per row, but for example a row comprises an alternation of cavity designs.

Referring to FIG. 12 it will be appreciated that the mould drum 22 is understood to be rotatably supported by a frame, e.g. of the device shown in FIG. 1, to revolve about drum rotation axis 24 in direction D. If desired the rotation of the drum 22 can be at continuous speed, or in a start-stop manner, e.g. periodically slowing and accelerating to have a mould cavity or row of mould cavities at standstill or low speed when in communication with mouth 18.

The FIG. 12 illustrates a pressurized air food product ejection system, wherein the mould drum 22 has air ducts 22a that extend to the mould cavities 25 (e.g. one air duct per longitudinal row of mould cavities). At least a portion of the surface delimiting a mould cavity 25 is air permeable, e.g. of porous material, e.g. of porous sintered metal. Each duct 22a is adapted to transport air to one or more of said mould cavities 25 so that said air passes through said air permeable mould cavity surface portion.

This air ejection system further comprises a pressurized air source 150 that is operable to feed pressurized air at a regulated ejection air pressure thereof to the air ducts 22a associated with one or more mould cavities 25 in a product release position thereof, here near the bottom part of the circular trajectory above the conveyor 80, so as to facilitate and/or cause ejection of the moulded food product P from the one or more mould cavities 25 at this product release position.

The ejection system comprises an air compressor 151, a pressurized air storage tank 152, a pressure regulating valve 153, and an air control valve 154 at the outlet of the tank 152. This source 150 is operable to feed pressurized air at a regulated ejection air pressure thereof to an air emitter 155 that is arranged on the frame near, e.g. close to the axial end of, the drum 22. In operation the inlets of the ducts 22a of the drum sequentially pass the air emitter 155 and align therewith; the valve 154 is then briefly opened to emit a burst of air into the duct 22a. This air then flows out of permeable surface of the one or more cavities 25 connected to said duct 22a and, as is known in the field, facilitates and/or causes ejection of the moulded food product from said one or more mould cavities at the product release position as is depicted in FIG. 12.

In addition to pressurized air being used in the process of ejection of moulded products from the drum, pressurized air is now also being used in the process of counteracting soiling of the mould drum, e.g. counteracting the built-up of a layer of residue on the permeable surface of the mould cavity.

FIG. 12 illustrates that the installation further comprises a mould cavity air purging assembly 250 that is operable and controllable independent from the pressurized air food product ejection system and is adapted to feed a burst of pressurized air from a pressurized air source to said one or more of said air ducts 22a associated with one or more mould cavities 25 when in a mould cavity air purge position thereof that is located intermediate the product release position and the fill position of said associated one or more mould cavities so as to cause loosening and/or removal of residue of foodstuff mass by said burst of pressurized air after ejection of the moulded food product has taken place and prior to filling the mould cavity for forming a product in said mould cavity.

In more detail the mould cavity air purging assembly 250 here comprises a second air compressor 251, a second pressurized air storage tank 252, a second pressure regulating valve 253, and a second or purging air control valve 254 at the outlet of the second air tank 252. This assembly further includes a second or downstream, relative to the first air emitter 155, air emitter 255 that is arranged on the frame near, e.g. close to the axial end of, the drum 22. In operation the inlets of the ducts 22a of the drum sequentially pass the air purging air emitter 255 and align therewith; the valve 254 is then briefly opened to emit a burst of air into the duct 22a. By bursting air into the duct 22a or ducts leading to the empty mould cavity 25 or row of emptied cavities 25 any residue of the foodstuff mass is subjected to a mechanical force that causes the residue to loosen or become totally dislodged and removed. This process is done whilst the installation is in operation for production of food products and does not interfere with the production.

FIG. 12 illustrates that a residue collector 160 is located this mould cavity air purge position relative to the drum surface 23 in order to collected dislodged foodstuff mass residue. For example the residue collector includes a vacuum system that sucks up any residue and conveys the residue into a collector container, e.g. using a suction fan and a separator device, like for example a cyclone separator.

It will be appreciated that the air ejection process and the air purging process are operable independent from one another. This for example, as preferred, allows cause, e.g. by the programmed controller 90, said purging bursts of air by means of assembly 250 at a selectable frequency, e.g. one burst per cavity or row of cavities connected to a duct per multiple revolutions of the drum, e.g. once every five revolutions of the drum.

For example the air purging frequency is settable by an operator of the installation and/or based on an automated routine run on the programmed controller 90. By having the option to set the frequency of the purging one can obtain effective purging whilst avoiding undue consumption of pressurized air for this purpose.

Another possibility brought along by having independent air purging is that the purging air bursts may be performed with air at another pressure than the air fed into the duct for the purpose of ejection of the moulded food product. For example the purging air burst are performed with air at a higher pressure than for ejection, e.g. for a shorter period. So one could envisage tank 252 being held at higher pressure than tank 152.

Instead of or in combination with an operator setting one or more of the parameters, e.g. pressure, frequency, timing, and/or duration, of the purging air bursts, one can envisage that the mould cavity air purging assembly is controlled by computerized controller 90 which is programmed to control the bursts of air for purging on the basis of at least one of: foodstuff mass handled by the installation, time or number of filling events expired since first use of cleaned mould drum, target fill pressure, or any combinations thereof. The control may involve setting the pressure and/or duration of the burst.

It will be appreciate that the purging process described herein does not interfere with the moulding of food products nor with the ejection thereof from the drum 5.

The FIG. 13 illustrates a pressurized air food product ejection system, wherein the mould drum 22 has air ducts 22a that extend to the mould cavities 25 (e.g. one air duct per longitudinal row of mould cavities). At least a portion of the surface delimiting a mould cavity 25 is air permeable, e.g. of porous material, e.g. of porous sintered metal. Each duct 22a is adapted to transport air to one or more of said mould cavities 25 so that said air passes through said air permeable mould cavity surface portion.

This air ejection system further comprises a pressurized air source 350 that is operable to feed pressurized air at a regulated ejection air pressure thereof to the air ducts 22a associated with one or more mould cavities 25 in a product release position thereof, here near the bottom part of the circular trajectory above the conveyor 80, so as to facilitate and/or cause ejection of the moulded food product P from the one or more mould cavities 25 at this product release position.

The ejection system comprises a first air compressor 351, a first pressurized air storage tank 352, a first pressure regulating valve 353, and a first air control valve 354 at the outlet of the first tank 352.

In this example the ejection system also comprises a second air compressor 361, a second pressurized air storage tank 362, a second pressure regulating valve 363, and a second air control valve 364 at the outlet of the second tank 362.

Generally, as with the earlier described source 150, the air ejection system is operable to feed pressurized air at a regulated ejection air pressure thereof to an ejection air emitter 155 that is arranged on the frame near, e.g. close to the axial end of, the drum 22. In operation the inlets of the ducts 22a of the drum sequentially pass the air emitter 155 and align therewith to allow the introduction of ejection air into the duct 22a. This air then flows out of permeable surface of the one or more cavities 25 connected to said duct 22a and, as is known in the field, facilitates and/or causes ejection of the moulded food product from said one or more mould cavities at the product release position.

It is envisaged that the assembly 350 allows to regulate the pressure of ejection air so as to provide air to each air duct 22a at a variable pressure level during a single air ejection event, for instance first at a lower air pressure and then at a higher air pressure.

For example pressurized air is stored in the first air storage tank 352 at a relatively high pressure and in the second storage tank 362 at a relatively low pressure. By suitable control of the valves 354 and 364 the effect can be achieved that—during a single ejection event—air from the first air storage tank 352 is released into the duct 22a during one part of the duration of the ejection event and air from the second storage tank 264 during the other part of the duration of the ejection event. As the ducts 22a may pass the emitter 155 in practical embodiments at a rate of over 100 ducts per minute, e.g. between 200 and 250 ducts per minute, this may involve control of timing of the valves 354, 364 in the milliseconds domain which is possible using e.g. direct operated solenoid valves. The valves 354, 364 may be arranged close to the emitter 155.

In a practical operation of the illustrated installation first the valve 364 of the second storage tank 362 is opened so that air at relatively (compared to the higher pressure in the first storage tank 352) low second pressure is fed into the duct 22a, e.g. causing an initial release of the moulded product from the cavity 25. Then with a very small lag time, a burst of higher pressure air from the first storage tank 352 is released by valve 354 and is used to cause the released product P to be effectively emitted from the cavity 25. In embodiments one can also envisage the initial application of the first air pressure and then the lower second air pressure.

FIG. 14a illustrates a mould drum 520 having rows of mould cavities 521, 522, 523 generally parallel to the drum axis. For each row of cavities a dedicated air duct 524, 525, 526 is provided in the drum. These ducts 524, 525, 526 here each have inlets or openings at both axial ends of the drum, e.g. in the stern face of the drum 520 as depicted here.

Figure 14B:
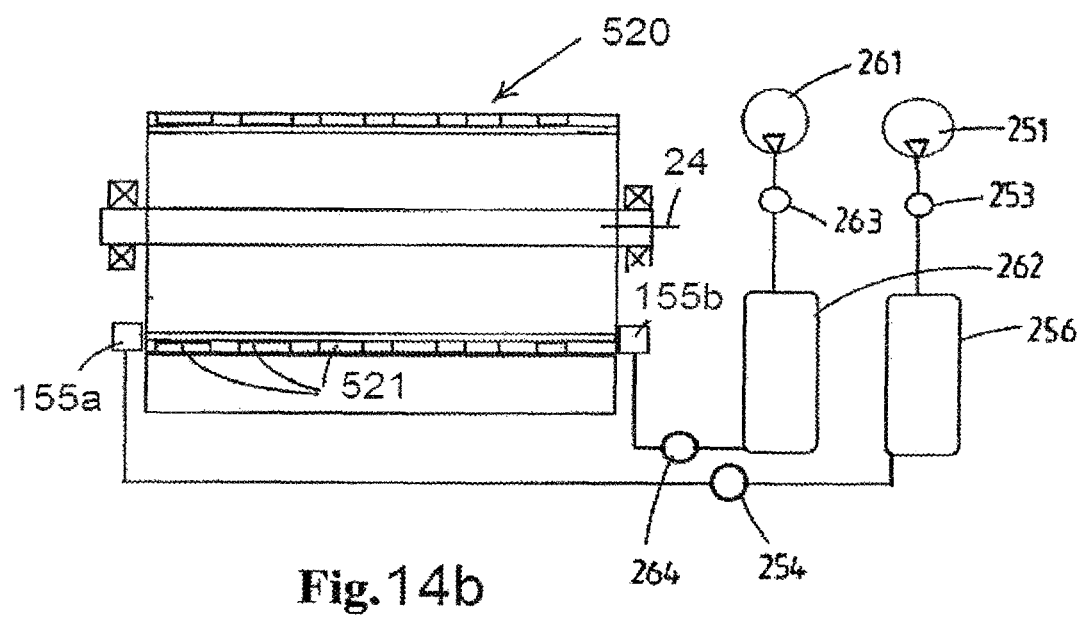

FIG. 14b illustrates the provision of two ejection air emitters 155a,b at the opposed axial ends of the path of the drum 520, the one air emitter 155a being connected via valve 254 to the first storage tank 256 and the second ejection air emitter 155b being connected via valve 264 to the second storage tank 262. It will be appreciated that this arrangement allows to obtain a two level air pressure burst to eject products from the mould cavities.

The use of variable pressure level, e.g. two distinct pressure levels, of the ejection air during a single air ejection event may serve to optimize the release and ejection of moulded food products as well as serve to optimize the use of pressurized air for this purpose. It will be appreciated that, if desired, more complex arrangements are possible to obtain a variation of air pressure over the duration of a single air ejection event, e.g. using rapidly responding air pressure control valve.

What is claimed is:

1. An installation for moulding of three dimensional products from a mass of pumpable foodstuff material, wherein the installation comprises:
    a feed pump for the foodstuff mass;
    a feed pump drive; and
    a moulding device comprising:
        a frame;
        a mobile mould member having multiple mould cavities, each having a filling opening for the introduction of foodstuff mass into the mould cavity, wherein the mould member is movably supported by the frame to move along a path, wherein the multiple mould cavities are arranged in one or more rows of multiple mould cavities each, wherein the cavities in a row are located at distinct positions in a perpendicular axis direction which is perpendicular to the path of the mould member;
        a mould member drive for moving the mould member along a path; and
        a mass feed member arranged at a fill position relative to the path of the mobile mould member, which mass feed member is connected to an outlet of the feed pump, said mass feed member having a housing defining an elongated chamber with a longitudinal axis extending in said perpendicular axis direction, said housing having a pair of spaced apart long lateral walls having a length and generally parallel to said longitudinal axis, short end walls interconnecting said lateral walls at respective longitudinal ends thereof, a bottom wall facing the mould member at the fill position along the path of the mould member,
    wherein said bottom wall is provided with a discharge mouth formed by one or more discharge openings spanning the path of said one or more rows of multiple mould cavities, so that foodstuff mass flows into each row of mould cavities via said discharge mouth, the discharge mouth being located directly adjacent the mould member,
    wherein the mass feed member is provided with a single elongated plunger that is slidably received in said chamber, sliding between said lateral walls and said end walls, opposite the bottom wall, the chamber being defined between the plunger and the bottom wall with the discharge mouth,
    wherein the installation comprises a plunger pulsing assembly adapted to cause periodic pulsating motions of said plunger in a range of travel of said plunger towards said bottom wall in synchronicity with successive alignments of successive rows of mould cavities with said discharge mouth,
    wherein at least one of said lateral walls of the housing of the mass feed member is provided with an introduction mouth for introduction of foodstuff mass into the chamber by means of said feed pump, said introduction mouth being formed by one or more introduction openings spanning a major portion of the length of said lateral wall, said lateral walls and end walls of said housing each having a portion that extends above said introduction mouth,
    wherein the mass feed member further comprises a valve associated with said introduction mouth and operable to open and close said introduction mouth, said valve comprising a valve actuator, wherein upstream of the valve, the mass is held at pressure by the feed pump, with said pressure being sufficient to replenish the chamber between successive pressure pulses, wherein the installation comprises a controller which is linked to said plunger pulsing assembly, to said valve actuator, and to said feed pump, which controller is adapted to operate said valve so that said valve opens and closes in synchronicity with the successive alignments of rows of mould cavities with said discharge mouth and with successive pulse motions of the plunger, such that said valve is closed when a row of mould cavities is aligned with said discharge mouth, wherein the controller is adapted to operate the plunger pulsing assembly such that, with said valve being closed, the single elongated plunger performs a pulse motion towards said bottom wall thereby causing a pressure pulse in said foodstuff mass in said chamber and the transfer of foodstuff mass into the row of mould cavities that is aligned with said discharge mouth, and wherein the controller is adapted to open the valve between successive pulse motions of the plunger and operate the feed pump such that said feed pump then replenishes the chamber with said foodstuff mass such that when each row of multiple cavities to be filled is aligned with the discharge mouth, in sequence:
the valve associated with the introduction mouth into the continuous space closes;
the plunger slides towards the bottom wall over the range of travel, so that that foodstuff mass flows into the row of mould cavities directly via said discharge mouth;
the plunger slides away from the bottom wall over the range of travel; and
the valve associated with the introduction mouth into the continuous space opens to replenish the continuous space with the foodstuff mass.

2. The installation according to claim 1, wherein said plunger pulsing assembly comprises one or more pneumatic actuators.

3. The installation according to claim 1, wherein the discharge mouth is formed by an orificed mouth body.

4. The installation according to claim 1, wherein said plunger has an imaginary unobstructed projection on said bottom wall seen in direction of travel of said plunger, and wherein said discharge mouth is located fully within said imaginary unobstructed projection of said plunger.

5. The installation according to claim 1, wherein said direction of travel of the plunger is perpendicular to said bottom wall of said housing.

6. The installation according to claim 1, wherein said introduction mouth is a singular elongated slotted passage or a series of passages distributed along the length of the lateral wall.

7. The installation according to claim 1, wherein said bottom wall has a slot wherein an exchangeable discharge mouth body is received so as to allow exchange of one discharge mouth body for another discharge mouth body having a different discharge mouth.

8. The installation according to claim 1, wherein the bottom wall of said housing of said mass feed member is provided with an orificed mouth body having multiple outlet orifices forming the discharge mouth so that said foodstuff mass flows into each mould cavity via multiple outlet orifices.

9. The installation according to claim 1, wherein the mould member is a mould drum, which mould drum has an outer circumferential drum surface and a horizontal longitudinal drum rotation axis, wherein the drum is rotatably supported by the frame to revolve about the horizontal axis, wherein the mould drum has in said drum surface said one or more rows of multiple mould cavities, which rows are spaced apart in circumferential direction and each extend parallel to said drum rotation axis.

10. The installation according to claim 9, wherein said controller is linked to said mould member drive, and
wherein said controller is adapted to stop or lower ta rotation speed when said row of mould cavities is aligned with said discharge mouth.

11. The installation according to claim 1, wherein said housing of the mass feed member has an introduction mouth in each lateral wall thereof, wherein a valve is associated with each of said introduction mouths and operable to open and close said introduction mouth, said valve comprising a valve actuator.

12. The installation according to claim 11, wherein a first piston pump is mounted onto a first lateral wall of said housing and a second piston pump is mounted onto a second lateral wall of said housing, wherein each of said first and second piston pumps has a single pump piston that is reciprocable in a pump chamber.

13. The installation according to claim 12, wherein said first and second piston pumps are arranged in a V relative to said mass feed member housing, and wherein said first and second piston pumps are each connected to a respective inlet duct.

14. The installation according to claim 13, wherein said inlet ducts are arranged in an inverted V and adjoin at a common hopper at their upper ends, which hopper is adapted to receive therein a supply of a foodstuff mass.

15. A method for moulding of three dimensional products from a mass of pumpable foodstuff material, using an installation which comprises:
a feed pump for the foodstuff mass;
a feed pump drive; and
a moulding device comprising:
a frame;
a mobile mould member having multiple mould cavities, each having a filling opening for the introduction of foodstuff mass into the mould cavity, wherein the mould member is movably supported by the frame to move along a path, wherein the multiple mould cavities are arranged in one or more rows of multiple mould cavities each, wherein the cavities in a row are located at distinct positions in a perpendicular axis direction which is perpendicular to the path of the mould member;
a mould member drive for moving the mould member along a path; and
a mass feed member arranged at a fill position relative to the path of the mobile mould member, which mass feed member is connected to an outlet of the feed pump, said mass feed member having a housing defining an elongated chamber with a longitudinal axis extending in said perpendicular axis direction, said housing having a pair of spaced apart long lateral walls having a length and generally parallel to said longitudinal axis, short end walls interconnecting said lateral walls at respective longitudinal ends thereof, a bottom wall facing the mould member at the fill position along the path of the mould member, wherein said bottom wall is provided with a discharge mouth formed by one or more discharge openings spanning the path of said one or more rows of multiple mould cavities, so that foodstuff mass flows into each row of mould cavities via said discharge mouth, the discharge mouth being located directly adjacent the mould member, wherein the mass feed member is provided with a single elongated plunger that is slidably received in said chamber, sliding between said lateral walls and said end walls, opposite the bottom wall, the chamber being defined between the plunger and the bottom wall with the discharge mouth, wherein the installation comprises a plunger pulsing assembly adapted to cause periodic pulsating motions of said plunger in a range of travel of said plunger towards said bottom wall in synchronicity with successive alignments of successive rows of mould cavities with said discharge mouth, wherein at least one of said lateral walls of the housing of the mass feed member is provided with an introduction mouth for introduction of foodstuff mass into the chamber by means of said feed pump, said introduction mouth being formed by one or more introduction openings spanning a major portion of the length of said lateral wall, said lateral walls and end walls of said housing each having a portion that extends above said introduction mouth, wherein the mass feed member further comprises a valve associated with said introduction mouth and operable to open and close said introduction mouth, said valve comprising a valve actuator, wherein upstream of the valve, the mass is held at pressure by the feed pump, with said pressure being sufficient to replenish the chamber between successive pressure pulses, wherein the installation comprises a controller which is linked to said plunger pulsing assembly, to said valve actuator, and to said feed pump, which controller is adapted to operate said valve so that said valve opens and closes in synchronicity with the successive alignments of rows of mould cavities with said discharge mouth and with successive pulse motions of the plunger, such that said valve is closed when a row of mould cavities is aligned with said discharge mouth, wherein the method comprises:

the controller operating the plunger pulsing assembly such that, with said valve being closed, the single elongated plunger performs a pulse motion towards said bottom wall thereby causing a pressure pulse in said foodstuff mass in said chamber and the transfer of foodstuff mass into the row of mould cavities that is aligned with said discharge mouth, and wherein the controller opens the valve between successive pulse motions of the plunger and operates the feed pump such that said feed pump then replenishes the chamber with said foodstuff mass such that when each row of multiple cavities to be filled is aligned with the discharge mouth, in sequence:

closing the valve associated with the introduction mouth into the continuous space;

sliding the plunger towards the bottom wall over the range of travel, so that that foodstuff mass flows into the row of mould cavities directly via said discharge mouth;

sliding the plunger away from the bottom wall over the range of travel;

opening the valve associated with the introduction mouth into the continuous space to replenish the continuous space with the foodstuff mass.

16. The method according to claim 15, wherein the foodstuff mass is ground beef, and wherein use is made of a discharge mouth formed by an orificed mouth body, wherein the orifices in the orificed mouth body have a diameter between 2 and 12 millimetres.

17. The method according to claim 15, wherein the single elongated plunger performs a pulse motion towards said bottom wall thereby causing a pressure pulse in said foodstuff mass in said chamber in a pressure range between 10 and 20 bars.

18. The method according to claim 17, wherein said feed pump is operated to introduce said foodstuff mass into said chamber at a pressure in a pressure range between 3 and 7 bars.

* * * * *